(12) United States Patent
Kang et al.

(10) Patent No.: US 9,279,891 B2
(45) Date of Patent: Mar. 8, 2016

(54) TRANSPARENT GLASS SCINTILLATORS, METHODS OF MAKING SAME AND DEVICES USING SAME

(75) Inventors: Zhitao Kang, Marietta, GA (US); Brent Karl Wagner, Marietta, GA (US); Jason Hayes Nadler, Decatur, GA (US); Robert Rosson, Acworth, GA (US); Bernd Kahn, Atlanta, GA (US); Meredith Brooke Barta, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 14/008,380

(22) PCT Filed: Mar. 29, 2012

(86) PCT No.: PCT/US2012/031275
§ 371 (c)(1),
(2), (4) Date: Feb. 7, 2014

(87) PCT Pub. No.: WO2013/022492
PCT Pub. Date: Feb. 14, 2013

(65) Prior Publication Data
US 2014/0166889 A1    Jun. 19, 2014

Related U.S. Application Data

(60) Provisional application No. 61/468,823, filed on Mar. 29, 2011.

(51) Int. Cl.
| | |
|---|---|
| *G01T 1/20* | (2006.01) |
| *C03C 4/12* | (2006.01) |
| *G01T 1/208* | (2006.01) |
| *G01T 3/06* | (2006.01) |
| *C03C 3/062* | (2006.01) |
| *C03C 3/064* | (2006.01) |
| *C03C 3/068* | (2006.01) |
| *C03C 10/16* | (2006.01) |

(52) U.S. Cl.
CPC ............... *G01T 1/2002* (2013.01); *C03C 3/062* (2013.01); *C03C 3/064* (2013.01); *C03C 3/068* (2013.01); *C03C 4/12* (2013.01); *C03C 10/16* (2013.01); *G01T 1/2006* (2013.01); *G01T 1/208* (2013.01); *G01T 1/2018* (2013.01); *G01T 3/06* (2013.01)

(58) Field of Classification Search
CPC ... G01T 1/2002; G01T 1/2018; G01T 1/2006; G01T 3/06
USPC ......................................................... 250/366
See application file for complete search history.

(56) References Cited

U.S. PATENT DOCUMENTS

| | | | |
|---|---|---|---|
| 2007/0063154 A1* | 3/2007 | Chen et al. ................. | 250/483.1 |
| 2008/0128624 A1* | 6/2008 | Cooke et al. .............. | 250/361 R |

FOREIGN PATENT DOCUMENTS

| | | |
|---|---|---|
| CN | 1636910 A | 7/2005 |
| CN | 1693248 A | 11/2005 |
| CN | 1955130 A | 5/2007 |

OTHER PUBLICATIONS

Arikawa et al., "Custom-designed scintillator for laer fusion diagnostics—Pr3+-doped fluoro-phosphate lithium glas scintillator," 2010, Optical Materials, vol. 32, pp. 1393-1396.*

*Primary Examiner* — Kiho Kim
(74) *Attorney, Agent, or Firm* — Troutman Sanders LLP; Ryan A. Schneider; Troy S. Kleckley

(57) ABSTRACT

Compositions and methods are described for transparent glass composite having nanoparticles therein that scintillate in the presence of nuclear radiation, particularly gamma rays, but also x-rays, alpha particles, beta particles, and neutrons. The transparent glass composites can be prepared by a melt/cool process to produce the transparent glass composite. The wavelength of light emitted by the transparent glass composite can be tailored based on the materials used to make the glass composite. A detector that utilizes the transparent glass composite can measure nuclear radiation from numerous sources.

44 Claims, 13 Drawing Sheets

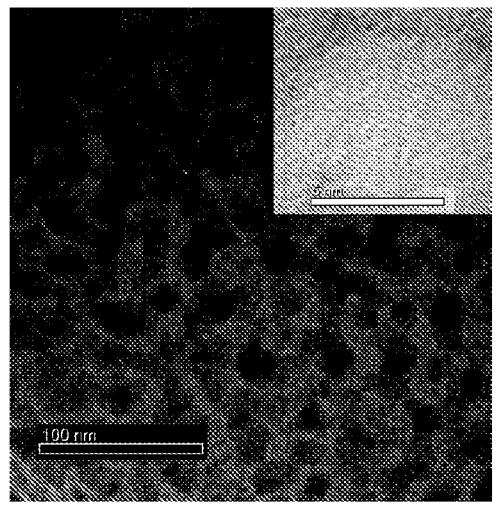 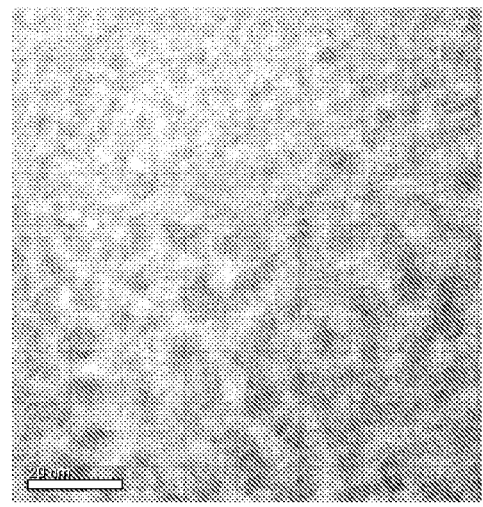
Figure 2 (a)                    Figure 2 (b)
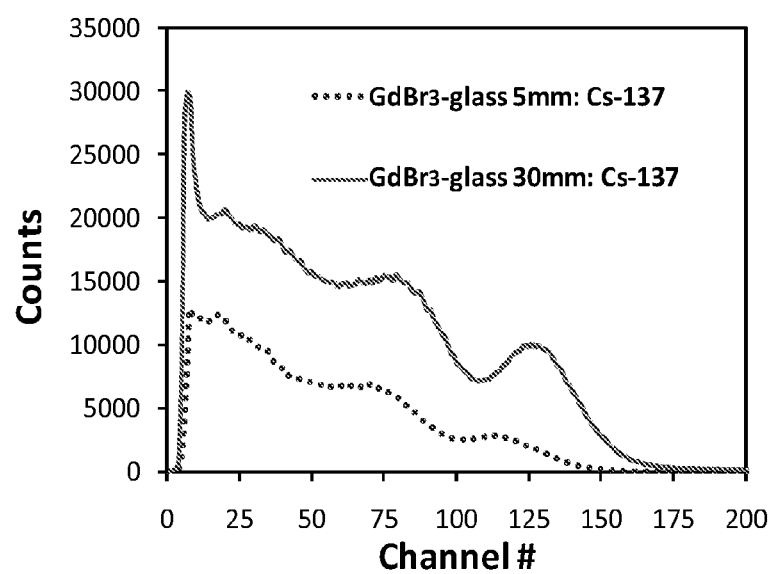
Figure 3

TRANSPARENT GLASS SCINTILLATORS, METHODS OF MAKING SAME AND DEVICES USING SAME

FEDERALLY SPONSORED RESEARCH STATEMENT

The invention described in this patent application was made with Government support under Grant Award No. 2008-DN-077-ARI015-02 from the U.S. Department of Homeland Security. The Government has certain rights in the invention described in this patent application.

CROSS-REFERENCE TO RELATED APPLICATIONS

This application is a US National Stage of International Application No. PCT/US2012/031275, filed on 29 Mar. 2012, which claims the benefit under 35 U.S.C. §119(e) of U.S. Provisional Patent Application Ser. No. 61/468,823, filed 29 Mar. 2011, the entire contents and substance of both herein fully incorporated by reference as if set forth below.

TECHNICAL FIELD

The various embodiments of the present disclosure relate generally to transparent glass composites for use as scintillators for detecting and measuring radiation products from decaying radioactive nuclei, including gamma rays, x-rays, alpha particles, beta particles, neutrons, and the like. More particularly, various embodiments of the present disclosure are directed toward glass composites containing nanoparticles based on a lanthanide doped metal salt, methods of making these materials, and applications using these materials.

BACKGROUND OF THE INVENTION

Single crystal detectors such as NaI:Tl and many other inorganic salts have been developed and used for gamma ray detection. These single crystals have several the desirable characteristics, including well-defined preparations, light emission at wavelengths suitable for photomultiplier tube (PMT) detection and amplification, efficient light transmission, and uniform light generation and transmission to produce spectra with good full-energy peak resolution. However, they are plagued by several substantial weaknesses that make them difficult or inapplicable to use in non-ideal conditions, e.g. in the field or in a port. These weaknesses include instability due to humidity, mechanical shock, and temperature fluctuations among other issues. Moreover, while materials such as NaI:Tl are excellent for gamma ray detection, they are often inapplicable for detection other forms of nuclear radiation. As an alternative, solid-state detectors far exceed the resolution of these inorganic crystals but so far are limited in size or require operation at very low temperature.

Use of nanoparticles to prepare large detectors for gamma-ray spectroscopy has been proposed to bypass these difficulties. Nanoparticles held in a small matrix have been reported within the past 9 years to yield single peaks attributed to interaction with gamma rays and alpha particles. Sheng Dai et al. prepared CdSe/ZnS quantum dots (1-20 nm dia.) embedded in a thin disk of a clear sol-gel. When the disk was exposed to the 5,300-keV alpha particles emitted by $^{210}$Po and the emitted light (peaking at a wavelength of about 590 nm) was collected with a PMT, they observed an energy continuum with a multichannel analyzer. Letant and Wang impregnated a porous glass slab (~1×1×0.025 cm) with CdSe/ZnS quantum dots, exposed this material to the 59.5-keV gamma rays and 5,500 keV alpha particles emitted by $^{241}$Am, collected the emitted light with a PMT, and observed a peak associated with each type of radiation. McKigney et al. attached small pieces of LaF$_3$.Ce particles (<10 nm dia.) embedded in an organic matrix (several mm on a side) to a small Teflon container, exposed them to gamma rays of 59.5 keV and 122 keV emitted by $^{241}$Am and $^{57}$Co, respectively, collected the emitted light (330 nm) with a PMT, and observed peaks for both radionuclides.

Recently, fabrication methods and optical properties of transparent oxyhalide glass composites containing GdF$_3$ compounds doped with Tb$^{3+}$, Eu$^{3+}$ and Dy$^{3+}$ were studied by Shan et. al. Lakshminarayana et al. further reported on the characteristics of a similar GdF$_3$ glass composite with Pr$^{3+}$, Sm$^{3+}$ doping. However, few studies have been conducted in terms of gamma-ray spectroscopy applications. Such materials, utilized in a scintillator, could efficiently convert nuclear radiation to photons of a wavelength detectable by photomultiplier tubes (PMT) while the highly transparent nature of the matrix could potentially give rise to promising efficiency and resolution for nuclear radiation detection.

SUMMARY

The various embodiments herein provide transparent glass composites for detecting nuclear radiation using nanoparticles distributed in glass bodies, transparent glass composites prepared by a specific processes, methods for preparing the transparent glass composites, and devices utilizing the transparent glass composites for detection of nuclear radiation.

An exemplary embodiment can be a transparent glass composite having a glass body and a plurality of nanoparticles distributed within the glass body. An initial composition used to prepare the glass composite can have a matrix metal compound and a dopant metal compound, and the combination of the matrix metal compound and the dopant metal compound can be at least 10 mol % of the initial composition. In some embodiments, the combination of the matrix metal compound and the dopant metal compound can be at least 15 mol % of the initial composition; or at least 18% of the initial composition. The combination can also be from about 10 mol % to about 35 mol %, about 15 mol % to about 35 mol %, or about 18 mol % to about 30 mol %.

In some embodiments, the dopant metal compound can be from about 1.5 to about 7 mol % of the total composition, about 2.5 mol % to about 6.5 mol %, about 2.5 mol % to about 6.5 mol %, from about 3 mol % to about 6 mol %. The dopant metal compound can also be greater than 1.5 mol %, greater than 2.5 mol %, or greater than 3 mol % of the initial composition.

In some embodiments, the nanoparticles can have an average size of from about 1 nm to about 50 nm, from about 2 to about 40 nm, from about 2 nm to about 30 nm, or from about 5 nm to about 30 nm. In some embodiments, the refractive index of the nanoparticle and the refractive index of the glass body can differ by less than about 50%, by less than about 33%, or less than about 25%.

In some embodiments the matrix metal compound can be a gadolinium, strontium, barium, lutetium, lanthanum, yttrium, or calcium compound. In some embodiments, the dopant metal compound can be a cerium, europium, terbium, erbium, thallium, promethium, dysprosium, holmium, samarium, neodymium, or thulium compound. In some embodiments, the compound can be a salt. In other embodiments the salt can be a halide salt, such as fluoride, chloride, bromide or iodide.

In an exemplary embodiment, the transparent glass composite can interact with nuclear radiation including gamma rays, x-rays, alpha particles, beta particles and neutrons. When interacting with any of nuclear radiation products, the transparent glass composite can scintillate. Alpha particles and beta particles interact directly, while passage of X rays, gamma rays, and neutrons stimulates electrons and ions that interact to generate scintillations.

Another exemplary embodiment can be a transparent glass composite having a glass body and a plurality of nanoparticles distributed in a glass body. The glass body can be prepared by heating an initial composition comprising a dopant metal compound, a matrix metal compound, and an inorganic glass former to the melting point of the initial composition to form a molten glass, cooling the molten glass to form a glass body, and optionally reheating the glass body to above its glass transition temperature for about 2 to about 72 hours. In some embodiments, the dopant metal compound and matrix metal compound can each independently be a metal halide. The combination of dopant metal compound and matrix metal compound comprise at least 10 mol % of the initial composition. In some embodiments, the combination of the matrix metal compound and the dopant metal compound can be at least 15 mol % of the initial composition; or at least 18 mol % of the initial composition. The combination can also be between about 10 mol % and 35 mol %, about 15 mol % to about 35 mol % to about 35 mol %, or about 18 mol % to about 30 mol %.

In some embodiments, the dopant metal compound can be from about 1.5 to about 7 mol % of the total composition, about 2.5 mol % to about 6.5 mol %, about 2.5 mol % to about 6.5 mol %, from about 3 mol % to about 6 mol %. The dopant metal compound can also be greater than 1.5 mol %, greater than 2.5 mol %, or greater than 3 mol % of the initial composition.

In some embodiments, the nanoparticles can have an average size of 1 to 50 nm, from about 2 to about 40 nanometers, from about 2 nm to about 30 nm, or from about 5 nm to about 30 nm.

In some embodiments, the nanoparticles can have an average size of from about 1 to about 50 nm, from about 2 to about 40 nanometers, from about 2 nm to about 30 nm, or from about 5 nm to about 30 nm. In some embodiments, the refractive index of the nanoparticle and the refractive index of the glass body can differ by less than about 50%, by less than about 33%, or less than about 25%.

In some embodiments the matrix metal compound can be a gadolinium, strontium, barium, lutetium, lanthanum, yttrium or calcium compound. The matrix metal compound can also be gadolinium compound, or a gadolinium halide. In some embodiments, the dopant metal compound can be a salt of cerium, europium, terbium, erbium, thallium, promethium, dysprosium, holmium, samarium, neodymium, or thulium salt. The dopant metal compound can also be a halide of cerium, europium, or terbium.

An exemplary embodiment can be a method for preparing a transparent glass composite having the steps of preparing a mixture of a matrix metal compound, a dopant metal compound, and an inorganic glass former, heating the mixture to above the melting point of the mixture; and cooling the mixture to solidify a glass body. The matrix metal compound can be a gadolinium, strontium, barium, luticium, lanthanum, or calcium compound or salt, and the dopant metal compound can be a compound or salt of cerium, europium, terbium, erbium, thallium, promethium, dysprosium, holmium, samarium, neodymium, or thullium. In some embodiments, the matrix metal compound and the dopant metal compound are each independently be a halide salt. The halide can be a fluoride, chloride, bromide or iodide.

The cooling step can be conducted at a rate sufficient to form nanoparticles. The method can also include an optional step of heating the solid glass body to a temperature between the glass transition temperature and the melting temperature to form nanoparticles, for about 2 to about 72 hours, or at least about 5 hours.

The combination of dopant metal halide and metal halide in the method can be at least 10 mol % of the initial composition. In some embodiments, the combination can be at least 15 mol % of the initial composition; or at least 18% of the initial composition. The combination can also be between about 10 mol % and 35 mol %, about 15 mol % to about 35 mol %, or about 18 mol % to about 30 mol %.

An exemplary embodiment can be a transparent glass scintillator comprising an initial composition of a dopant metal compound, a matrix metal compound, and a silicate, with the dopant metal compound being a salt of cerium, europium, terbium, erbium, thallium, promethium, dysprosium, holmium, samarium, neodymium, or thullium, the matrix metal compound being a salt of gadolinium, barium or calcium, and the silicate containing an aluminosilicate, and where the transparent glass scintillator contains a plurality of nanoparticles. The matrix metal compound can be a gadolinium halide, and the dopant metal compound can be a cerium, europium, or terbium salt. The nanoparticles can have an average size of about 1 nm to about 50 nm, or from about 2 nm to about 30 nm. The combination of the matrix metal compound and the dopant metal salt can be at least 10 mol % of the mixture, or about 15 mol % of the mixture.

An exemplary embodiment can be a spectroscopic device having a transparent glass composite and a light amplifier or detector proximate to or in free optical path with the transparent glass composite. The transparent glass composite can have a glass body and a plurality of nanoparticles distributed within the glass body, and an initial composition to prepare the glass composite can be a matrix metal compound and a dopant metal compound, where the combination of matrix metal compound and dopant metal compound is at least 10 mol % of the initial composition. The device can detect at least one type of nuclear radiation. In an embodiment, the light amplifier comprises a photomultiplier tube or a photodiode element or array. The device can further have electronics in communication with the light amplifier and/or a multichannel analyzer. The device can have a transparent glass scintillator and the light amplifier that operate in the same region of the electromagnetic spectrum. The device can detect at least one type of nuclear radiation, such as gamma rays, xrays, alpha particles, beta particles or neutrons. Alternatively, the device can detect at least two types of nuclear radiation. The device can also potentially detect gamma rays, xrays, alpha particles, beta particles and neutrons.

BRIEF DESCRIPTION OF DRAWINGS

FIG. 1(b) illustrates photoluminescence emission spectra for a transparent glass composite in accordance with exemplary embodiments of the present invention.

FIGS. 2 (a) and 2 (b) illustrate TEM images of transparent glass composites in accordance with exemplary embodiments of the present invention.

FIG. 3 illustrates gamma-ray spectroscopy for transparent glass composites in accordance with exemplary embodiments of the present invention.

DETAILED DESCRIPTION

Figure 1:
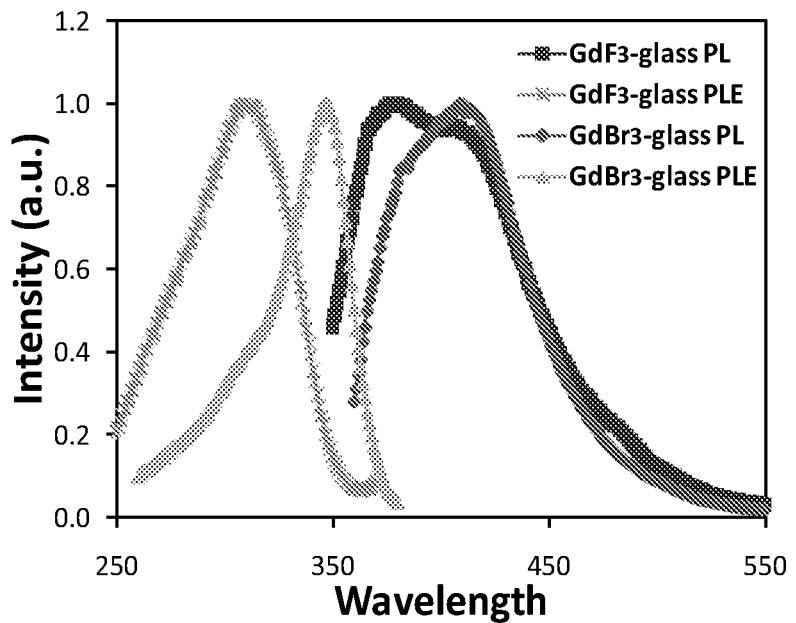
FIG. 1 (a) illustrates photoluminescence emission and photoluminescence excitation spectra for a transparent glass composite in accordance with exemplary embodiments of the present invention.
Figure 1:
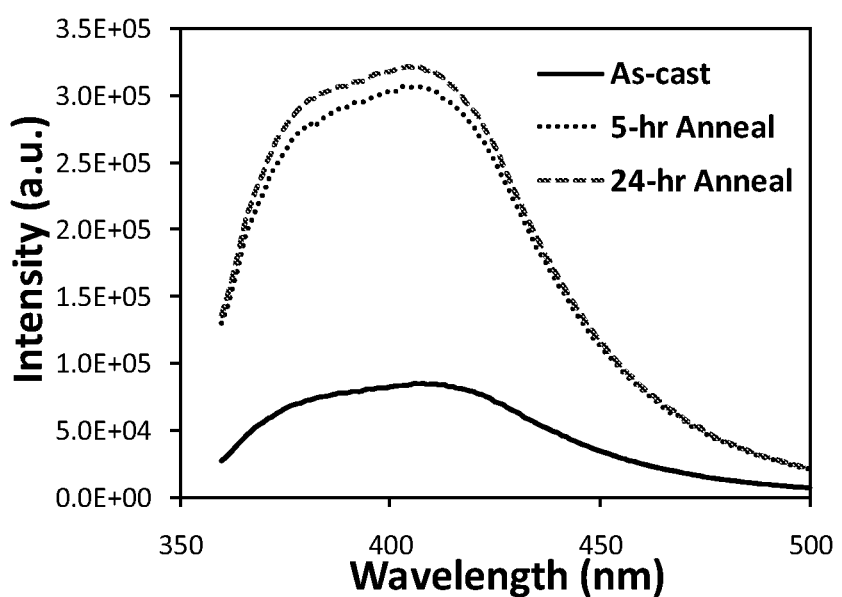

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" one particular value and/or to "about" or "approximately" another particular value. When such a range is expressed, other exemplary embodiments include from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

The various embodiments of this application are directed to the creation of a transparent glass composite that can scintillate in the presence of nuclear radiation and emissions thereof, including but not limited to gamma rays, x-rays, alpha particles, beta particles, and neutrons, as well as UV radiation. The transparent glass composites disclosed herein are the first glass materials to demonstrate a photopeak associated with incoming gamma ray radiation, efficiently converting nuclear radiation to photons at a wavelength detectable by light amplifiers such as photomultiplier tubes, while still remaining transparent for the emitted light.

The transparent glass composite provides access to a new class of scintillators that have several advantages over the current materials used today. For example, the traditional single crystal materials, such as NaI:Tl suffer from factors such as humidity, mechanical shock, and temperature fluctuations. In comparison, the transparent glass composites are stable under normal conditions, and do not have the previous issues. Moreover, the transparent glass composites are also capable of interacting with a wide range of nuclear radiations, including gamma rays, x-rays, alpha particles, beta particles and neutrons.

The transparent glass composites, prepared by a melt-quench method with appropriate compositions, followed by an optional thermally-controlled crystallization, can be a cost-saving alternative of traditional single-crystalline scintillators with better mechanical/thermal durability and chemical stability. The fabrication of glass composites also addresses scalability and shaping issues associated with single crystals fabrication. These nanoparticle-containing glass composites are most promising for this type of application, especially for gamma-ray spectroscopy.

Rare-earth ion doped gadolinium halides in an aluminosilicate glass composite are one example of a in this disclosure, and benefits from favorable properties of the halide crystal environment and the oxide glass structure. Nucleation of halide nanocrystals with cations of rare-earth ion activators can produce a material with high transparency and stability of the oxide glass matrix. The halide environment can provide lower phonon energies for the luminescent center, which reduces non-radiative de-excitation and leads to a higher detection efficiency. In addition, with controlled nanoparticle size can minimizeoptical scattering effects and achieve high transparency. These transparent glass composites contain the low phonon energy halide nanocrystals that are embedded among a stable oxide glass, imparting excellent chemical and mechanical performances. Constructing these glass composites as a detector provides the opportunity to fabricate robust, application-specific large-volume, low-cost detectors that can utilize selected high-Z materials for effective γ-ray energy absorption.

In an embodiment, the transparent glass composite can have a glass body and nanoparticles distributed within the glass body, where an initial composition used to prepare the glass composite includes a matrix metal compound and a dopant metal compound, and the combination of the matrix metal compound and the dopant metal compound is at least 10 mol % of the initial composition. In an embodiment, the nanoparticles can be distributed evenly throughout the glass body, but need not necessarily be perfectly evenly distributed throughout the glass body. For example, distributed can include a larger portion of the nanoparticles closer to the center of the glass body, with a lesser amount towards the edges. The nanoparticles can also described as being distributed uniformly.

In another embodiment, the transparent glass composite can include a glass body and a plurality of nanoparticles distributed in a glass body, where the glass body can be prepared by heating an initial composition having a dopant metal halide, a matrix metal halide, and an inorganic glass former to the melting point of the initial composition to form a molten glass, cooling the molten glass to form a glass body. The glass body can optionally be reheated to above its glass transition temperature for about 2 to about 72 hours. The combination of the dopant metal halide and the matrix metal halide comprises at least 10 mol % of the initial composition.

Nanoparticles as that term is used herein can indicate a particle, crystal, or substance within the glass body of the transparent glass composite. The nanoparticles can also be referred to as nanocrystals or nanocrystallites. While not wishing to be bound by theory, the nanoparticles of the present invention can be composed of materials added to the initial composition, including particularly the dopant metal compound and the matrix metal compound. Therefore the nanoparticles can also be referred to based on the components that were used in the mixture. For example, if a dopant metal compound was a lanthanide compound, and the matrix metal compound was another metal compound, then the nanoparticle might be described as a lanthanide doped metal nanoparticle. Similarly, if a glass composite was created using a gadolinium halide and a cerium halide as a dopant metal, the nanoparticle can be described as a cerium doped gadolinium nanoparticle. Due to the nature of the materials, the nanoparticles might also be referred to as nanophosphors.

These transparent glass composites, having a nanophosphor embedded in a glass composite can be effective for scintillation applications because the probability of radiative recombination in ordered crystalline environments is usually larger than in disordered amorphous glass matrices.

In these transparent glass composites, the nanoparticles can be formed in-situ during the preparation and can be uniformly distributed in the glass body. The size of these nanoparticles can be controlled to an extent, and can be significantly smaller than the wavelength of the light they emit. Scattering theory indicates that the optical attenuation length due to scattering is strongly affected by the particle size and difference in refractive indexes between the particles and the glass body. Therefore, the transparent glass composites can be prepared by controlling the particle size and by refractive index matching of the components in the composite.

In an embodiment, the size of the nanoparticle can be between about 1 nm and about 50 nm, between about 2 nm and 40 nm, between about 2 nm and about 35 nm, between about 2 nm and about 30 nm, between about 5 nm and about 35 nm, between about 5 nanometers and about 30 nm, between about 10 nm and about 35 nm, and between about 10 nm and about 30 nm. The size of the nanoparticles can be at least about 1 nm, at least about 2 nm, at least about 3 nm, at least about 5 nm, or at least about 10 nm. The size of the nanoparticles can be less than about 50 nm, less than about 40 nm, less than about 35 nm, or less than about 30 nm.

The nanoparticles and the glass body each have a refractive index, and the difference in the refractive indexes can affect the transparency of the glass composite. For a glass body having a refractive index $n^G$, and a nanoparticle having a refractive index $n^M$, a smaller difference between the two values could accompany larger sizes of the nanoparticles therein. In an embodiment, $n^M$ can differ from $n^G$ by less than about 50%, less than about 33% or less than about 25%. In an embodiment, additional compounds can be included that increase the refractive index of the glass body, and reduce the difference in indexes. Compounds recognized by one or ordinary skill to increase the refractive index can be used. By way of example, lead (Pb) can be included to increase the refractive index of the glass body. Note that Pb can also increase the density and thus stopping power of the glass composite The amount of material used to prepare the transparent glass composite displays a role in determining if the composite will scintillate. The initial composition of a matrix metal compound and a dopant metal compound determine both the existence and the effectiveness of the glass composites to respond to nuclear radiation, particularly gamma rays, and scintillate. The complete absence of either the dopant metal or the matrix metal compound results in a composite that will not scintillate, is not transparent, or both. Lower amounts of these materials also will not result in a composite that scintillates in response to at least gamma rays. In an embodiment, the combination of the matrix metal compound and the dopant metal compound can be at least 10 mol % of the total components in the initial mixture. In another embodiment, the combination of the matrix metal compound and the dopant metal compound can be at least 12 mol %, at least 15 mol %, at least 17 mol % or at least 18 mol %. The combination of the matrix metal compound and the dopant metal compound can also be too high, often leading to poor glass formation or other unfavorable properties. Therefore the combination of the matrix metal compound and the dopant metal compound can be at less than about 50 mol % of the total components in the initial mixture, less than about 40 mol %, or less than about 35 mol %. In one particular embodiment, the combination of matrix metal compound and dopant metal compound can be less than about 30 mol % of the total components in the initial mixture. In another embodiment, the combination of matrix metal compound and dopant metal compound can be from about 10 mol % to about 35 mol %, from about 15 mol % to about 35 mol %, or from about 18 mol % to about 30 mol %.

The amount of dopant in the initial composition can also affect the nature of the composite. In an embodiment, the dopant metal compound can be at least 0.5 mol % of the initial composition, at least about 1 mol %, at least about 1.5 mol %. In another embodiment, the dopant metal compound can be at least about 2 mol %, at least about 2.5 mol % or at least about 3 mol %. For some materials, there can be a maximum amount of dopant material that above which the properties of the composite may decrease. One theory can be that when dopant metal centers become too numerous, the centers begin to transfer energy among themselves in a process known as concentration quenching. In some embodiments, the dopant metal compound can be less than about 10 mol %, less than about 9 mol %, less than about 8 mol %, or less than about 7 mol %. The dopant metal compound can be less than about 6.5 mol % or less than about 6 mol %. In another embodiment, the dopant metal compound can be from about 1.5 mol % to about 7 mol %, from about 2.5 mol % to about 6.5 mol %, or from about 3 mol % to about 6 mol %.

As noted above, an initial composition of materials can be used to prepare the transparent glass composite. The initial composition can include a matrix metal compound and a dopant metal compound. The matrix metal compound can be any metal compound known by one of ordinary skill in the art to exhibit high nuclear radiation absorption, preferably high gamma ray absorption in the construction of a scintillation material. In an embodiment, the matrix metal compound can be a gadolinium (Gd), strontium (Sr), barium (Ba), lutetium (Lu), lanthanum (La), yttrium (Y), or calcium (Ca) metal compound. In an exemplary embodiment, the matrix metal compound can be a gadolinium, strontium, barium, lanthanum, or calcium, or can be gadolinium, barium, or calcium compound. In one embodiment, the matrix metal compound can be a gadolinium, can be barium, can be calcium, can be strontium, can be lutetium, or can be lanthanum compound. The matrix metal compound can be added as any compound that will melt and form a glass in the presence of an inorganic glass former. In an embodiment, the matrix metal compound can be a salt, and oxide, or other compound of the cationic matrix metal, preferably a salt, oxide or hydroxide, and more preferably a salt. In an exemplary embodiment, the matrix metal compound can be salt, preferably a matrix metal halide. Salts can act as a flux material during the creation of the transparent glass, and the halide salts can be particularly effective during this process.

The dopant metal compound can be any dopant metal known by one of skill in the art to exhibit high luminescence efficient in a nuclear radiation absorption and scintillation material. In an embodiment, the dopant metal compound can be a cerium (Ce), europium (Eu), terbium (Tb), erbium (Er), thallium (Tl), promethium (Pr), dysprosium (Dy), holmium (Ho), samarium (Sm), neodymium (Nd), thulium (Th), ytterbium (Yb), bismuth (Bi), lead (Pb), or manganese (Mn) compound, preferably a cerium, europium, terbium, erbium, thallium, promethium, dysprosium, holmium, samarium, neodymium, or thulium compound. In another embodiment, the dopant metal compound can be a cerium, europium, or terbium compound. The wavelength of light emission can vary for different dopant metal compounds, allowing creation of different transparent glass composites having different wavelengths of light. The dopant metal compound can then be selected to efficiently match the light output wavelength to a detector, such as a PMT, with which the transparent glass composite is associated.

The dopant metal compound can be added as any compound that will melt and form a glass in the presence of an inorganic glass former. In an embodiment, the dopant metal compound is a salt, oxide, or other compound with a cationic dopant metal, preferably a salt, oxide or hydroxide, and more preferably a salt. In an exemplary embodiment, the dopant metal compound can be a dopant metal salt, preferably a dopant metal halide.

In an embodiment, the halide in the transparent glass composite can be fluoride (F), chloride (Cl), bromide (Br), or iodide (I); also known as fluoro, chloro, bromo or iodo. In an alternate embodiment, the halide can be F, Cl, or Br. These halides can have several roles in the transparent glass composite and its preparation. As the atomic weight and atomic number (Z) increase, e.g. high Z halides, these elements can have higher interactions with the incoming nuclear radiation. Conversely, the halides can sometimes undergo decomposition or volatilization during conditions of glass body formation. The optimal halide can vary depending on heating conditions or times.

Light yield increases with the concentration of scintillating compounds (assuming transparency is maintained), and thus the concentration of scintillating compounds should be as close to 100% as possible in the composite. The concentration of scintillating compounds that can be incorporated into a glass composite depends on the degree of solubility of these compounds in the glass, which is in turn controlled by the amount of free volume in the glass network. Glasses whose primary structure is composed of silicate or phosphate tetrahedra generally have a larger free volume than glasses whose primary structure is triangularly coordinated boron atoms, and thus are able to accept a greater concentration of scintillating compounds while maintaining sample transparency in the visible range. If the concentration of scintillating compounds is too high, the glass may reject the undissolved compounds, causing a second crystalline phase with particle size larger than the emitted wavelength to form and reduce transparency of the cooled sample. Phase separation may also occur between compounds in the glass composite, causing the cooled sample to appear completely opaque or develop an opalescent appearance depending upon the degree of mismatch between the refractive index of the two phases.

Thus, in an embodiment, the glass body of the transparent glass composite can include any material known by one of ordinary skill in the art to form a glass. The glass body can include materials such as silicate, borate, borosilicate or phosphate glasses, or mixtures thereof. The glass body can preferably include an aluminosilicate, a borosilicate, or aluminoborosilicate glass, and combinations thereof. In an embodiment, the material used to create the transparent glass composite includes an inorganic glass former, where the inorganic glass former can include any material known by one of ordinary skill in the art for form a transparent glass. The inorganic glass former can be analogous to the compounds described for the glass body, including silicates, borates, borosilicates, aluminosilicates, phosphates and combinations thereof. The inorganic glass former can preferably include an aluminosilicate, a borosilicate, and aluminoborosilicate and combinations thereof. In another embodiment, the inorganic glass former can be an aluminosilicate or an aluminoborosilicate and combinations thereof.

The glass formers, and the glass body, each can include a counterion associated with the inorganic glass former. In an embodiment, the inorganic glass former includes a lithium or sodium cation, or a combination thereof. In an embodiment, the glass body can include a lithium or sodium cation, or combination thereof.

Neutron radiation detection is also important for today's society. From medical and industrial neutron radiographic imaging, to national security concerns, and to science experiments that revealing material structures, new and improved detectors are in high demand. New detector materials are sought that have increased detection efficiencies, better energy and spatial resolution, quicker decay times, greater portability, and less economic costs. Scintillator is one major group of the detection materials. Requirements for the scintillators to detect intense neutrons with a good spatial resolution are (1) large light output with high detection efficiency, (2) fast decay and minimum afterglow, and (3) suppression of background γ-rays due to inefficiency or discriminating capability. Traditional neutron scintillators include Li-glass, LiF/ZnS:Ag, $LiBaF_3:Ce^{3+}$ and various other single crystal or powder phosphor materials. LiF/ZnS:Ag screens are prepared with ZnS:Ag powder crystals and LiF using an organic binder, which give a large light output of 160,000 photons/neutron, but a slow decay time ~1 µs. Because micro sized powder were used, LiF/ZnS:Ag is opaque, giving a limitation in the efficient readout from thin screens. Single crystals of various scintillators can be prepared with high transparency, however, the high fabrication cost and limited size/shape hinder the application of these materials.

The transparent glass composites that contain a Li-based scintillating glass are an attractive neutron detection material in view of its low-cost, large-volume production possibility and easy shaping of elements. Nanoparticles embedded in the glass composite can function for neutron detection, because the probability of radiative recombination in ordered crystalline environment is usually larger than in disordered amorphous glass. In addition, such materials provide a desirable low phonon energy halide environment for activator ions while maintaining the advantages of an oxide glass, such as high mechanical strength, chemical durability, and thermal stability.

In addition, the glass body can include isotopes that function as excellent neutron capture sources. In an embodiment, the glass body can include a $^6Li$ (lithium-6) isotope or $^{10}B$ (boron-10) isotope. Lithium-6 and boron-10 can be effective for capturing neutrons, and passing the energy associated with that absorption to the atoms in the transparent glass composite to be released as luminescence.

In an embodiment, the transparent glass composite can be prepared by a method of first, preparing a mixture of a matrix metal compound, a dopant metal compound and an inorganic glass former, second, heating the mixture to above the melting point of the mixture, third, cooling the mixture to form a solidified glass body. The matrix metal compound can be any matrix metal compound known to one of ordinary skill in the art, and can be Gd, Sr, Ba, Lu, La, Y or Ca. The dopant metal compound can be any compound known by one of ordinary skill in the art to act as an emitter or luminescence source, and can include Ce, Eu, Tb, Er, Tl, Pr, Dy, Ho, Sm, Nd, Th, Yb, Bi, Pb, or Mn. The combination of the matrix metal compound and the dopant metal compound can be at least 10 mol %. The amounts and choice of metal compounds are analogous to the descriptions noted in the transparent glass composites above.

In an embodiment, the cooling step can be conducted at rate that allows for the formation of nanoparticles in the glass body. In an alternative embodiment, the glass body can be allowed to cool, and then, in a fourth step, heated to a temperature between the glass transition temperature ($T_g$) and the melting temperature for between about 2 hours and about 72 hours to form nanoparticles. Formation of nanoparticles and growth of nanoparticles coincides with a sharp increase in the luminescence and efficiency for scintillation in the presence of gamma rays. Glass composites that have not undergone a reheating or a slow cooling above a glass transition temperature do not exhibit the sufficient luminescence or efficiencies in the presence of gamma rays. The nanoparticle development or growth can be achieved by reheating the glass body to above $T_g$ of the material and holding the sample above $T_g$ for at least about 2 hours, preferably at least about 5 hours. The sample can be held at that temperature for up to at least 72 hours. Alternatively, the glass body need not be cooled completely but could be cooled as such a rate to allow nanoparticles to form. For example, the glass body could be cooled at such a rate to maintain a time between the melting point and $T_g$ for at least about 2 hours or more. For particularly large glass samples, the initial melt must be cooled at a slow rate such that the crystal does not accumulate thermal stress associated with rapid cooling. During that cooling period, nanoparticle formation can begin to occur.

The transparent glass composite can be used in any application suitable for a scintillating material. In an embodiment, the transparent glass composite can be used is device designed to detect nuclear radiation. The device can have the transparent glass composite and a light amplifier or detector. The light amplifier can collect the light produced by the transparent glass composite during scintillation, and convert that information into an electrical feed for further processing. In an embodiment, the transparent glass composite and the detector or amplifier are proximate to each other in such a manner that the light from the composite passes unimpeded to the detector or amplifier. In another embodiment, the transparent glass composite and the detector or amplifier can be in an free optical path with each other, as for example, when a series of mirror or light guides direct or communicate the light to the detector. The transparent glass composite in the device can have the glass body and plurality of nanoparticles distributed within the glass body, and an initial composition to prepare the glass composite can be a matrix metal compound and a dopant metal compound, and the combination of matrix metal compound and dopant metal compound is at least 10 mol % of the initial composition. Each and every disclosure set forth above and through applies to this material as well. The device can detect at least one type of nuclear radiation.

In an embodiment, the light amplifier can be a photomultiplier tube or a photodiode element or array. Because the light emitted from the composite can be adjusted across the ultraviolet and visible spectrum by selecting specific dopants, an embodiment can include a transparent glass composite and the light amplifier that operate in the same region of the electromagnetic spectrum.

The device can also include electronics in communication with the light amplifier or detector, and can include a multichannel analyzer to evaluate the data measured by the scintillator.

The scintillators described herein using the transparent glass composite are able to measure each type of nuclear radiation in the group of gamma rays, x-rays, alpha particles, beta particles and neutrons. With that flexibility the device can be used to measure at least at least one of the types of nuclear radiation, at least two of the types of nuclear radiation, at least three, at least four or all five of the types of nuclear radiation selected from the group consisting of gamma rays, x-rays, alpha particles, beta particles and neutrons.

The detector material described here has been applied in different contexts for radiation detection. Single-crystal gadolinium silicate doped with cerium has been used effectively for gamma-ray spectral analysis. A $GdBr_3$.Ce single-crystal detector has shown good spectral response at room temperature and improved response at lower temperatures. Glass that includes lithium or boron and is activated with cerium is commonly used for neutron detection, but can also be used for detecting beta particles and gamma rays.

Reference will now be made in detail to specific aspects of the disclosed materials, compounds, compositions, articles, and methods, examples of which are illustrated in the accompanying Examples and Figures.

EXAMPLES

Example 1

Cerium Doped Gadolinium Halide

Powders of high-purity grade gadolinium halide and cerium halide were mixed with conventional glass forming chemicals: $SiO_2$, $Al_2O_3$ and NaF at a molar ratio of $50SiO_2$-$16Al_2O_3$-$19NaF$-$13GdX_3$-$2CeX_3$. (X can be fluoride or bromide). Each batch weighed from 10 to 40 grams and was contained in a graphite plate covered alumina crucible. Samples were heated in an argon atmosphere at 200° C. for 1 hour and then melted at 1450° C. for 1 hour to form a homogenous liquid mixture. The samples were then quenched to room temperature by directly casting the melt into a preheated graphite mold of 2.5 cm in diameter. The cast precursor glass samples were subsequently annealed at temperatures between 450° C. and 750° C. to release thermal stress and promote nanocrystal precipitation.

Cylindrical glass composite samples with different halide compositions were fabricated and characterized in this work. Photoluminescence (PL) and Photoluminescence Excitation (PLE) spectra of samples were obtained with a Spex1000M spectrometer using a 150 W xenon lamp/monochromator combination as the excitation source. Samples were ground into powders for the PL/PLE comparison tests in order to eliminate the errors induced by size differences and alignment issues for bulk samples. Transmission Electron Microscopy (TEM) measurements were performed on carefully thinned samples using a Hitachi H-9500 TEM to verify nanocrystal precipitation.

Radiation measurements were carried on all the prepared glass and glass composite samples. Cylindrical samples were wrapped with light reflective Teflon tapes during the gamma-ray spectra testing to avoid undesirable light loss from the side. A radionuclide source was placed on top of the sample for excitation. The sample and source were placed on a Photomultiplier Tube (PMT) detector and the entire assembly was shielded to block external light. Optical grease was applied between the sample and the PMT detector to decrease interface scattering. Photons generated by the sample were recorded by the PMT, and their energy and intensity distributed over 1,024 channels with a total counting times between 100 and 100,000 seconds.

Blue-emitting $Ce^{3+}$-doped $GdF_3$ and $GdBr_3$ containing glass and glass composite samples with different sizes/shapes were prepared in this study. Compared to single crystal scintillators, glass and glass composite can be easily fabricated with low-cost and exhibit advantages of high-volume production possibility and easy shaping of elements for complex geometries, including glass fibers with light guiding capabilities. The $Ce^{3+}$-doped $GdF_3$ and $GdBr_3$ glass composite samples showed intensive UV to blue light emission under an ultraviolet excitation at 365 nm or 254 nm. A $GdBr_3$-aluminosilicate glass sample of 2.5 cm in diameter and 3 cm in height was prepared, as well as a $GdF_3$-aluminosilicate glass fiber obtained by a hot-drawing method.

The normalized PL and PLE spectra for $GdF_3$ and $GdBr_3$ based aluminosilicate glasses are presented in FIG. 1(a). For the $GdF_3$-glass, two PL peaks at ~380 nm and ~410 nm were observed with the maximum located at ~380 nm, and an excitation band peaked at ~310 nm was detected by monitoring at 380 nm. A Stokes shift of ~70 nm yields relatively weak self-absorption. For the $GdBr_3$-glass, two similar PL peaks were shown but the maximum emission wavelength red-shifted to ~410 nm. The PLE peak also shifted to a longer wavelength of ~350 nm for monitoring at 410 nm. Excitation and emission bands for both materials were attributed to the transitions in the 4f-5d band of $Ce^{3+}$ ions. Broad transition bands were observed because the 5d orbital of trivalent $Ce^{3+}$ ions lacks a shielding shell and thus is susceptible to the matrix crystal field. The $GdBr_3$-containing glass may provide a weaker crystal field and the red-shift of the transition observed was the same as from the reported $GdBr_3$:Ce single crystal materials.

As shown in FIG. 1(b), after annealing the $GdBr_3$ sample at 750° C. for 5 and 24 hours, the PL intensity was significantly enhanced for 350 nm excitation with no obvious change of the spectral shape. For the sample annealed for 24 hours an increase in intensity of ~3.5 times was observed compared to the precursor glass, indicating an enhancement of light emission due to nanocrystal formation in the glass composite and/or a further concentration of activators inside the growing nanocrystals. The sample still remains highly transparent after annealing, which is critical for gamma-ray spectroscopy applications.

The annealed glass composite samples were characterized by TEM measurements. As indicated in FIG. 2(a), $Ce^{3+}$-doped $GdF_3$ glass composite annealed at 670° C. for 10 hours shows a homogeneous distribution of spherical nanocrystalline precipitates within the amorphous matrix. The inset shows a high resolution TEM image of a nanocrystal with lattice fringes clearly revealed. The sizes of these nanocrystallites were estimated to be ~20 nm Shan reported similar results and confirmed the crystalline precipitates to be $GdF_3$ by X-ray diffraction, and the fact that the doped rare-earth-ions concentrated in the crystals. A TEM micrograph of a $Ce^{3+}$-doped $GdBr_3$ glass composite after annealing at 750° C. for 10 hours is shown in FIG. 2(b). Uniformly distributed nanoparticle precipitates of <10 nm in size were also observed. Further investigations are in progress to identify the phase structure.

Gamma-ray spectroscopy pulse height results for two $Ce^{3+}$-doped $GdBr_3$ samples of different thicknesses are presented in FIG. 3. $^{137}Cs$ was used as the radionuclide source with a counting time of 100 seconds. Full energy photopeaks were observed at channels #128 and #115 for a 30 mm-thick sample and a 5 mm-thick sample, respectively. The thicker sample exhibited a better resolved photopeak which is critical for radionuclide identification. The relative resolution of the material is defined as the full-width half-maximum energy divided by the energy of the gamma-ray. Thus, the thicker sample showed a resolution of 27% versus 31% for the thinner sample.

The detector efficiency is defined as the probability that a gamma-ray will interact with the detector and produce a count. A thicker detector will provide a better environment for the absorption of gamma-ray (gamma-ray stopping power) and subsequent light emission to produce a count. The count rate of ~20,000/s for the thicker sample and ~8000/s for the thinner one is consistent with the theory. The detection efficiency of the thicker sample was comparable to a conventional NaI:Tl detector of similar volume.

These results are submitted to confirm the potential application of a $Ce^{3+}$-doped gadolinium halide glass composite detector in energy spectral analysis of nuclear radiation. For the first time, a glass composite based scintillator was demonstrated for gamma-ray spectroscopy with distinctive photopeaks clearly resolved. With low fabrication cost, high volume production capability, and high chemical and mechanical stability, glass and glass composite scintillators are promising candidates for gamma-ray spectroscopy if the resolution can be further improved.

Example 2

General Method for Preparing Silicate Glasses of Cerium Doped Gadoliuium Bromide The same basic method was used to synthesize all glass systems with a general composition of $SiO_2$—$Al_2O_3$—NaF—$GdBr_3$—$CeBr_3$. The following constituent powders available from Alfa Aesar were used for the glass synthesis: 2 μm $SiO_2$ (99.5%), 3 μm gamma-phase $Al_2O_3$ (99.97%), NaF, $GdBr_3.XH_2O$ (99.99%), and $CeBr_3.XH_2O$ (99.999%). A "base glass" composition of $46SiO_2$-$15Al_2O_3$-$17NaF$-$17GdBr_3$-$2CeBr_3$ was used as a starting point for all investigations. Precise quantities of $GdBr_3$ and $CeBr_3$ were varied to observe the effects of different scintillating material concentration. Precursor powders were thoroughly mixed with a mortar and pestle and then packed into a 50 mL $Al_2O_3$ crucible, with powder batch sizes ranging from 50-130 g. The crucible was covered with a one-quarter inch thick graphite plate and placed in a high temperature muffle furnace. Additional crucibles filled with carbon powder and $BaBr_2$ were also placed around the sample crucible to provide a slightly reducing atmosphere and an excess of bromine, respectively. The furnace chamber was purged with argon gas, heated to 200° C. and held for two hours to remove residual water, then heated to 1400° C. and held for one hour to melt all components, with a final heating to 1450° C. to provide additional fluidity of the melt needed for casting. After dwelling at 1450° C. for one hour, the crucible was removed from the furnace and the melt cast into a cylindrical graphite mold. If the sample volume was 15 $cm^3$ or greater, it was placed in an annealing furnace at 450° C. and control cooled to room temperature to prevent thermal shock. The cooled glass was then be reheated to a temperature slightly above the glass transition to precipitate and/or grow the crystalline phase. Samples were lapped and polished before performing characterization studies.

Thermogravimetric and differential thermal analyses (TG-DTA) were performed to observe the behavior of the precursor glass powders during heating and to find glass transition and crystallization temperature ranges of the as-cast glass. The $T_g$ for the base glass was estimated from the DTA curves using the intersection of the tangents drawn just before and just after the onset of the glass transformation peak, which appears as an exotherm during a heating study of cast glass. This data could then be used to formulate aging studies and explain composition changes and weight loss observed during synthesis. Samples of each component powder were also evaluated independently in addition to analysis of the entire mixture of constituent glass powders. For the crystallization and transition regions of the as-cast glass, 120 mg samples of coarsely and finely ground powder were heated in an argon atmosphere at 10° C./min to 1000° C., then cooled to room temperature. Coarse and fine powders were scanned separately to determine if surface crystallization had a significant contribution during the aging process. For the precursor component powders, 75 mg samples were heated in an argon atmosphere at 3° C./min to 1000° C., and then cooled to room temperature.

Photoluminescence emission (PL) data were collected to allow for quantitative comparison between samples with different compositions and/or aging times. Tests were performed on both ground glass powders and solid chunks at an excitation wavelength of 350 nm.

Table 1 details base glass compositions that were investigated.

TABLE 1

| Composition (mol %) | | | | | | Aging Sequence | | PL/PLE Performed | | XRD | |
|---|---|---|---|---|---|---|---|---|---|---|---|
| SiO2 | Al2O3 | NaF | GdBr3 | CeBr3 | mol %GdBr3: Ce | Temperature (° C.) | Time (Hr) | PLE λ | PL λ | Precursor | Aged (Hr) |
| 48 | 15 | 18 | 15 | 2.9 | 18% | 670 | 10 | Y | Y | N | 10 hrs |
| 48 | 15 | 18 | 15 | 2.9 | 18% | | | Y | Y | | |
| 48 | 15 | 18 | 15 | 0 | 16% | | | Y | Y | Y | |
| 48 | 15 | 18 | 15 | 2.9 | 18% | | | | | | |
| 48 | 15 | 18 | 15 | 2.9 | 18% | 850 | 24 | Y | Y | | |
| | | | | | | 950 | 24 | N | N | N | 48 hrs |
| | | | | | | 950 | 2, 4, 6, 8, 12 | N | N | N | 4, 6, 8 hrs |
| | | | | | | 750 | 5, 10, 24, 48, 60 | N | N | N | 5, 24, 48 hrs |
| 48 | 15 | 18 | 15 | 2.9 | 18% | | | N | N | | |
| 48 | 15 | 18 | 15 | 2.9 | 18% | — | — | N | N | | |
| 48 | 15 | 18 | 15 | 2.9 | 18% | — | — | N | N | | |

Glass samples with the composition (in mol %) $46SiO_2$-$15Al_2O_3$-$17NaF$-$17GdBr_3$-$4CeBr_3$ were used in aging studies to observe growth of the crystalline phases at a range of aging times and temperatures. Shards of as-cast glass were aged at 750° C. for 5, 10, 24, 48, and 60 hours, and at 950° C. for 2, 4, 6, 8, 12, and 48 hours. The sample aged at 950° C. for 48 hours was used to find the point at which the matrix experiences complete devitrification. X-ray diffraction (XRD) studies were performed to observe the evolution of the scintillating crystalline phase from the amorphous matrix. PL analysis was also performed to observe the change in light yield and luminescent efficiency. A summary list of sample conditions in the $CeBr_3$—$GdBr_3$ composition studies are shown in Table 2 and Table 3.

TABLE 2

| Composition (mol %) | | | | | | Aging Sequence | | PL/PLE Performed | | XRD | |
|---|---|---|---|---|---|---|---|---|---|---|---|
| SiO2 | Al2O3 | NaF | GdBr3 | CeBr3 | mol %GdBr3:Ce | Temperature (°C.) | Time (Hr) | PLE λ | PL λ | Precursor | Aged |
| 48 | 15 | 18 | 16 | 3 | 19% | — | — | Y | Y | Y | N |
| | | | 16 | 3 | | 670 | 3 | Y | Y | | |
| | | | 16 | 3 | | 890 | 3 | Y | Y | | |
| | | | 16 | 3 | | 910 | 3 | Y | Y | | |
| 48 | 15 | 18 | 17 | 4 | 21% | — | — | Y | Y | Y | N |
| 48 | 15 | 18 | 18 | 4 | 21% | — | — | Y | Y | | |
| 48 | 15 | 18 | 19 | 4 | 22% | — | — | Y | Y | Y | N |

TABLE 3

| Composition (mol %) | | | | | | Aging Sequence | | PL/PLE Performed | | XRD | |
|---|---|---|---|---|---|---|---|---|---|---|---|
| SiO2 | Al2O3 | NaF | GdBr3 | CeBr3 | mol %GdBr3:Ce | Temperature (°C.) | Time (Hr) | PLE λ | PL λ | Precursor | Aged |
| 48 | 15 | 18 | 17.4 | 0.2 | 18% | — | — | Y | Y | Y | |
| 48 | 15 | 18 | 17.2 | 0.4 | 18% | — | — | Y | Y | | |
| 48 | 15 | 18 | 16.7 | 0.9 | 18% | — | — | Y | Y | | |
| 48 | 15 | 18 | 15 | 3 | 18% | | | | | | |
| 48 | 15 | 18 | 14 | 4 | 18% | 670 | 10 | Y | Y | N | Y |
| 48 | 15 | 18 | 11 | 6 | 17% | 800 | 10 | Y | Y | | Y |

Figure 4:
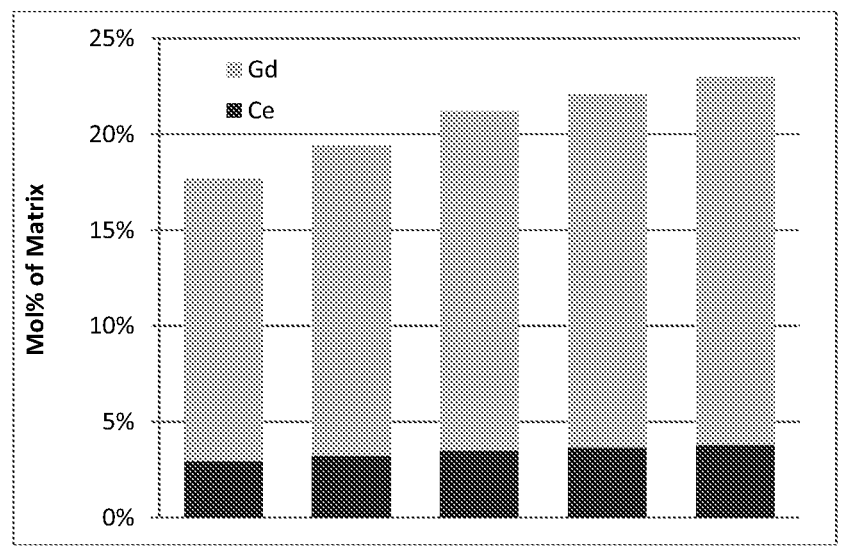
FIG. 4 illustrates sample ranges in accordance with exemplary embodiments of the present invention.

CeBr$_3$ and GdBr$_3$ concentrations in the glass composite were varied to ensure a maximum density of scintillating material while preserving sample transparency. Scintillating material should be increased to maximize the stopping power of the scintillator while preserving transparency of the matrix. This will ensure high gamma-ray energy absorption and minimal scattering of emitted photons. The initial glass composition contained 18 mol % CeBr$_3$ and GdBr$_3$, and the concentration was increased in 1 mol % intervals to until transparency was lost. Samples were also prepared to determine the contributions of CeBr$_3$ and GdBr$_3$ to the properties of the glass composite. Two samples were prepared using the base glass composition, but removing all CeBr$_3$ while keeping GdBr$_3$, then removing all GdBr$_3$ while keeping CeBr$_3$. FIG. 4 shows a schematic of the range of samples prepared in this study, whose compositions range from 18-22 mol % CeBr$_3$+GdBr$_3$ relative to the matrix.

Figure 5:
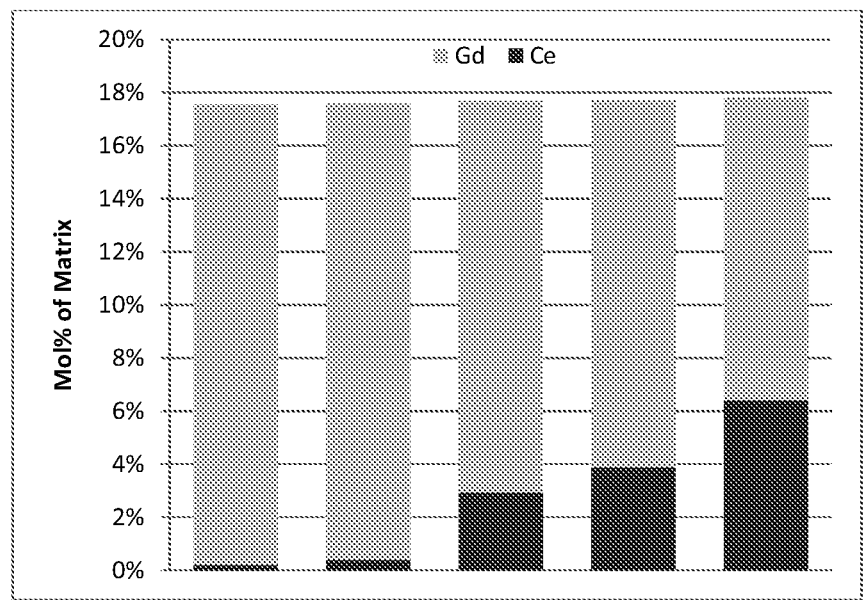
FIG. 5 illustrates sample ranges in accordance with exemplary embodiments of the present invention.
Figure 6:
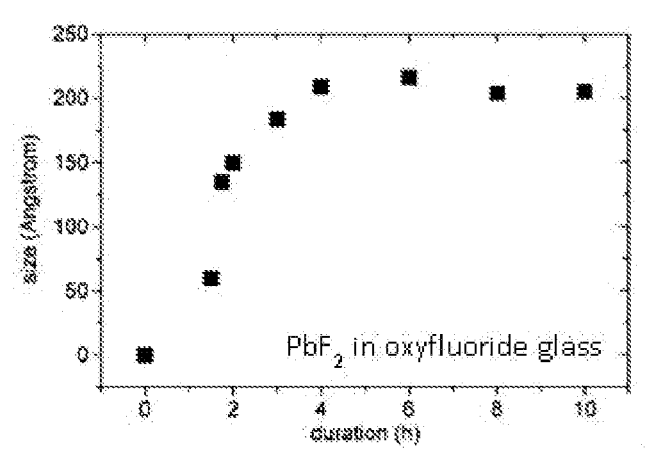
FIG. 6 illustrates particle growth rates for sample preparations, in accordance with exemplary embodiments of the present invention.
Figure 7:
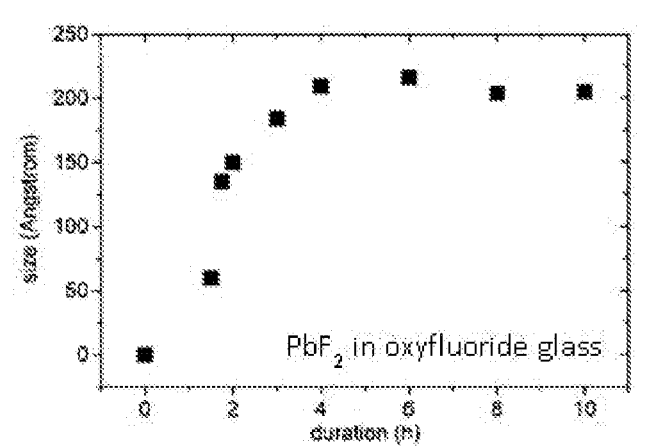
FIG. 7 illustrates particle growth rates for sample preparations, in accordance with exemplary embodiments of the present invention.

Ce$^{3+}$ acts as a luminescence center when paired with GdBr$_3$. Increasing CeBr$_3$ content will increase light yield until the concentration becomes too high and the Ce ions start transferring energy among themselves in a process known as concentration quenching. To determine this optimal Ce$^{3+}$ concentration, CeBr$_3$ content was varied between 0-6 mol % of the matrix while the combined CeBr$_3$—GdBr$_3$ concentration was held constant at 18 mol % of the matrix. FIG. 5 shows a schematic of the range of concentrations used in this study To produce a maximum number of photons per MeV of gamma-ray energy absorbed, the volume fraction scintillating phase in the glass composite should be maximized while preserving sample transparency. This is achieved by producing a high density, uniform spatial distribution, and narrow size distribution of scintillating crystals in the glassy matrix, with the average crystal size being smaller than one-half the wavelength of the emitted photons to ensure minimal scattering. Bhattacharyya et. al. suggested that the size of precipitated crystals can be self-limiting due to the formation of a silica rich shell around the rare-earth nanocrystals. Because the diffusivity of the rare-earth ion is reduced in the high viscosity shell, the particle growth rate approaches zero as the shell thickness increases. New particles may nucleate and grow in regions between existing particles before they, too, form a silica rich shell that impedes further growth. This diffusion-controlled growth mechanism creates a very narrow particle size distribution in the sample, and ensures isotropy of optical properties. Crystallite size is thus assumed to be controlled by aging temperature rather than aging time as shown by FIG. 6 and FIG. 7. FIG. 6 shows average crystallite size increasing with aging times up to 4 hours, past which no further growth seems to occur. Contrastingly, the average crystallite size continues to increase with aging temperature, as shown in FIG. 7, suggesting that average crystallite size is controlled by aging temperature rather than aging time. Aging temperature should thus be manipulated to ensure that a uniform spatial distribution of particles smaller than 50 nm is achieved.

Figure 8:
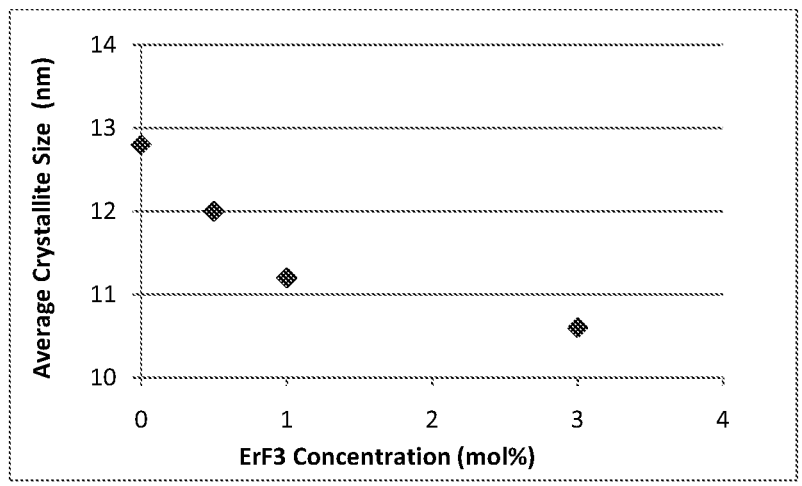
FIG. 8 illustrates particle growth rates for sample preparations, in accordance with exemplary embodiments of the present invention.

The crystalline phase may be formed via kinetic mechanisms such as nucleation and growth of the scintillating crystals directly from the glassy matrix. The latter method may cause crystals larger than the desired 30 nm to form due to incomplete dissolution of the seed compounds in the glass composite. Supersaturation of the glass with rare-earth halide compounds is the preferred method to form a uniform distribution of nuclei throughout the material. It has been suggested that varying the concentration of rare-earth halides in the glass can alter the maximum size of precipitated crystallites by increasing (or decreasing) the number of nuclei that form during melt quenching. A higher concentration of rare-earth compounds may form more nuclei per unit volume, resulting in a smaller average particle size as more growing crystallites compete for the precipitating compounds (see FIG. 8). However, whether this effect reaches a limit is not yet clear, and past a critical rare-earth concentration, growing crystals may begin to become interconnected and large enough to scatter emitted photons.

A glass cylinder with cerium-activated gadolinium bromide, 2.5 cm in diameter and 3 cm long was cast to form a scintillation detector for spectral analysis of nuclear radiation, especially gamma rays. Nanoparticles were observed in the annealed nanocomposite sample. The photoluminescence spectrum showed an under excitation at 350 nm. An emission band centered at 410 nm with a width of 80 nm at half maximum was observed. A photoluminescence excitation spectrum measured with a monitor wavelength at 410 nm showed a distinct excitation peak for all samples at about 350 nm with a shoulder at about 310 nm. Gamma ray spectra were obtained from this sample. The scintillator, operated with a conventional photomultiplier tube and associated power supply, amplifier, and multichannel analyzer, detected relatively intense full-energy gamma-ray peaks from 59.5 keV to 2,505 keV. The full-energy peaks were characterized in terms of energy vs. pulse height, resolution, and counting efficiency. The gamma-ray detection efficiency is comparable to a conventional NaI(Tl) detector of similar volume but the peak resolution at 662 keV in this new detector type is currently 26%, compared to about 7% resolution for a NaI(Tl) detector. Scintillation decay times on the order of 50 ns, consistent with $Ce^{3+}$ emission and very similar to $LaBr_3$:Ce, were measured under gamma ray excitation.

Figure 9:
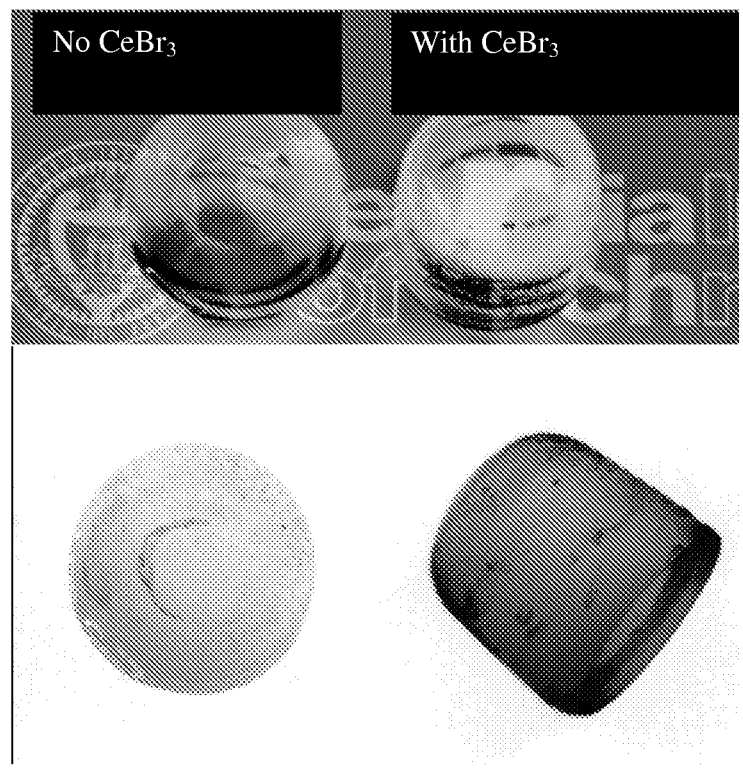
FIG. 9 illustrates a luminescent transparent glass composite in accordance with exemplary embodiments of the present invention.
Figure 10:
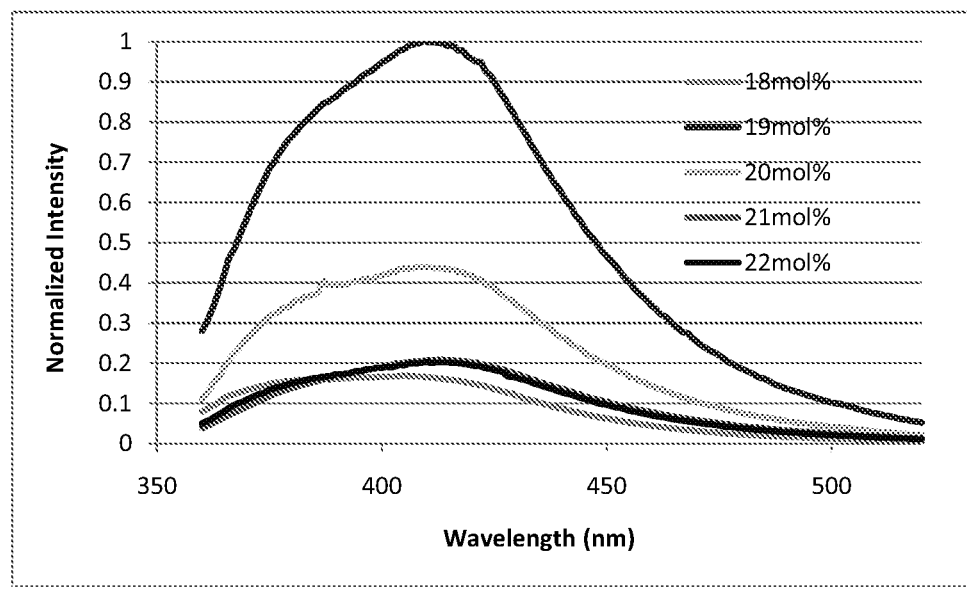
FIG. 10 illustrates photoluminescence emission spectra for a transparent glass composite in accordance with exemplary embodiments of the present invention.
Figure 11:
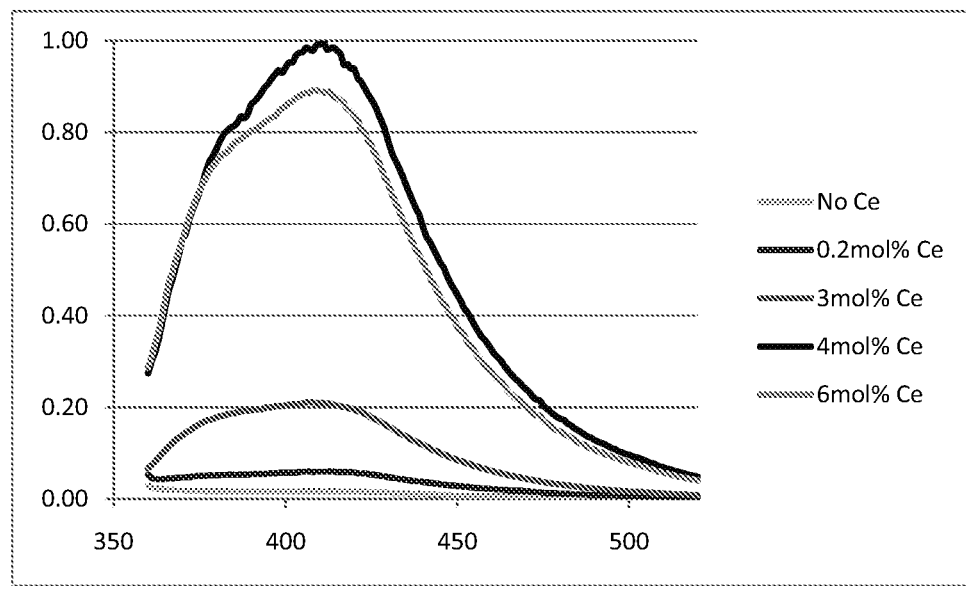
FIG. 11 illustrates photoluminescence emission spectra for a transparent glass composite in accordance with exemplary embodiments of the present invention.

The concentration of $CeBr_3$—$GdBr_3$ in the matrix was increased to 22 mol % of the matrix before transparency was lost completely. Above 20 mol %, the matrix became opaque and acquired a black color, hence 19 mol % appears to be the optimal concentration. When $CeBr_3$ was omitted, the glass was completely transparent, but exhibited no luminescence (see FIG. 9). When $GdBr_3$ was omitted, the temperature needed to be increased to 1550° C. before the melt was able to be cast, and the glass became black and opaque upon cooling.

From PL data, it can be seen that there is a clear maximum in intensity when the $CeBr_3$—$GdBr_3$ levels are increased to 19 mol % of the matrix. Samples with decreased $CeBr_3$—$GdBr_3$ concentrations were not tested because it is fairly well known that a lower scintillating material density will decrease light yield. Although matrix transparency is not completely lost until the concentration is increased to 22 mol %, it appears that competing interactions begin to interfere to reduce luminescence intensity at concentrations as low as 20 mol %. The weight loss indicated by TG data raises concerns that a significant amount of cerium and bromine may be volatilizing before the melt is cast, resulting in a lower scintillating material density than expected and decreasing light yield. If the processing temperatures could be lowered by altering the host glass matrix, this problem may be avoided. Possible substitutes for the current aluminosilicate matrix may include phosphate (as described above) or borate based glasses, which would eliminate $Al_2O_3$ and lower the temperature required for the precursor powder mixture to form a homogeneous melt.

When $CeBr_3$ is removed, the melt is easily cast at 1450° C. and produces a completely transparent glass upon cooling. The sample does not fluoresce under 350 nm excitation (see FIG. 9), illustrating the need for $Ce^{3+}$ to act as a luminescent center and increase the degree of radiative decay, hence increasing photon yield.

When $GdBr_3$ is removed, the processing temperature must be increased to 1550° C. to allow casting, but the glass turns dark black upon cooling and did not fluoresce under UV exposure. The cause for this behavior is currently unclear, but possibly the $GdBr_3$, which is nearly 50 wt % of the glass, served to reduce the melting temperature of the system. The $SiO_2$ and $Al_2O_3$, which comprise most of the other 50 wt % of the system, have melting temperatures of 1600° C. and 2000° C., respectively, and hence the omission of the low melting point $GdBr_3$ (770° C.) would have a pronounced effect on overall melt viscosity and homogenization temperature range. The effect of $GdBr_3$ is probably not unique, and other rare-earth halide compounds could also be used for the same purpose. However, $Gd^{3+}$ and $Ce^{3+}$ are well suited for forming substitutional solid solutions, and since $Ce^{3+}$ is known to be one of the most efficient luminescent ions, the combination is attractive.

Figure 14:
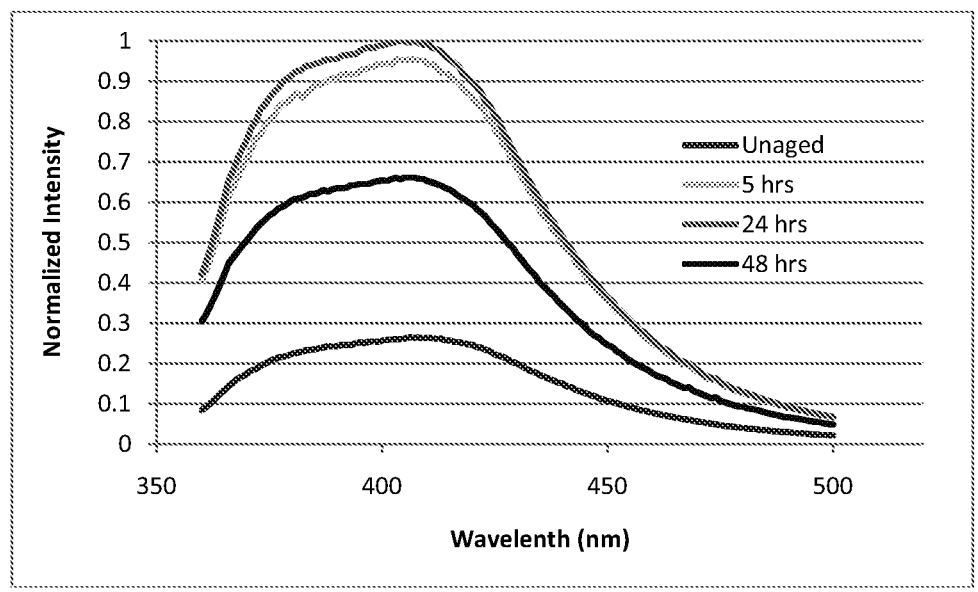
FIG. 14 illustrates photoluminescence emission spectra for a transparent glass composite in accordance with exemplary embodiments of the present invention.
Figure 15:
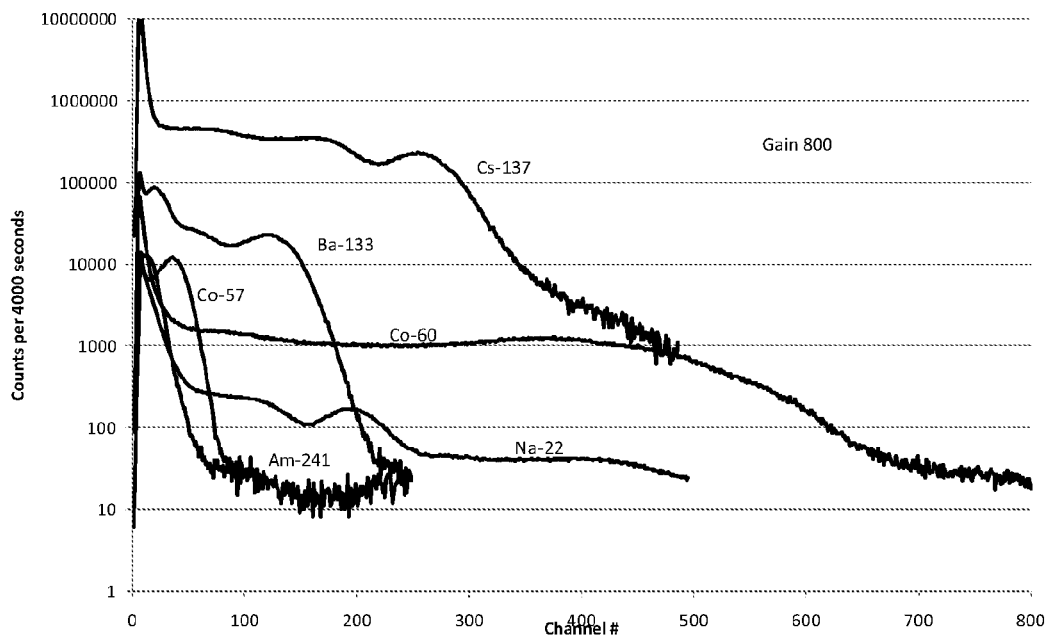
FIG. 15 illustrates spectra from a detector fabricated in accordance with exemplary embodiments of the present invention.

FIG. 14 shows a plot of PL data for the samples with increasing $GdBr_3$—$CeBr_3$ levels. From this data it is seen that the PL intensity peaks with a $GdBr_3$—$CeBr_3$ concentration of 19 mol % of the matrix. FIG. 15 shows PL data for samples with varying $CeBr_3$ concentration. A concentration of 4 mol % of the matrix was found to have the greatest luminescence intensity of the compositions synthesized, with a peak intensity between 400-450 nm. At greater than 4 mol %, the matrix began to turn black and become opaque.

From PL data, it can be seen that luminescence efficiency is maximized when $CeBr_3$ concentration is 4 mol % of the matrix. Below this level, the reduced number of luminescence centers results in a decreased light yield. Above this level, the scintillator most likely begins to experience concentration quenching due to interaction of fluorescent centers with emitted photons. The peak intensity between 400-450 nm correlates well with values found in the literature for single crystal $GdBr_3$:Ce, though the crystallographic environment of the $Gd^{3+}$ and $Ce^{3+}$ ions and distribution of scintillating material in the glass body is not yet clear. As stated previously, $CeBr_3$ appears to experience extensive volatilization during processing and a lower cerium density than expected may be present in the final glass.

Figure 12:
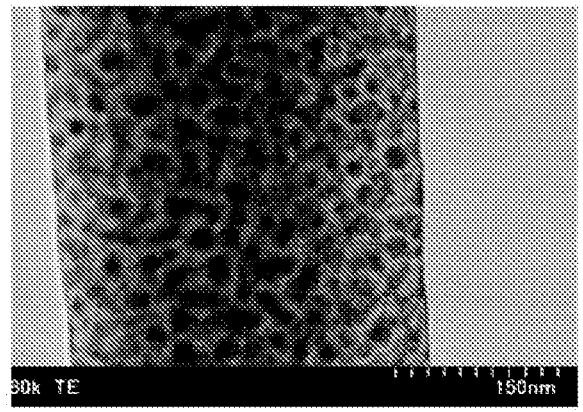
FIGS. 12(a) and 12(b) illustrate TEM images of transparent glass composites in accordance with exemplary embodiments of the present invention.
Figure 12:
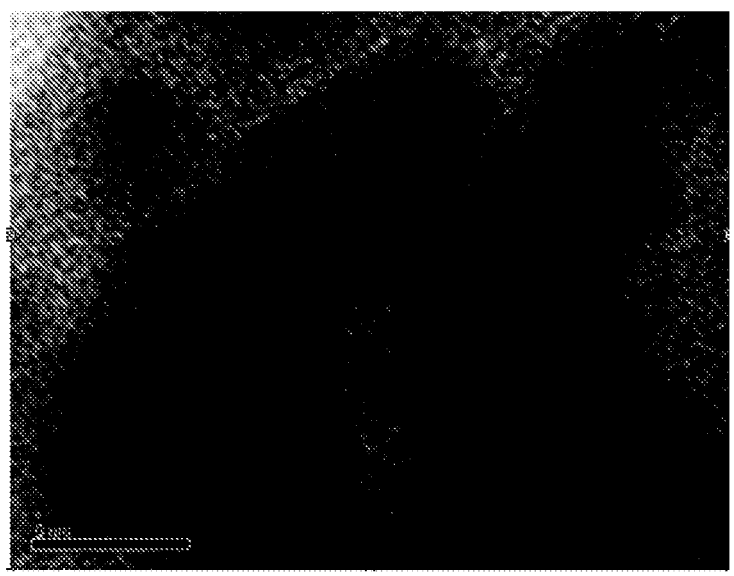
Figure 13:
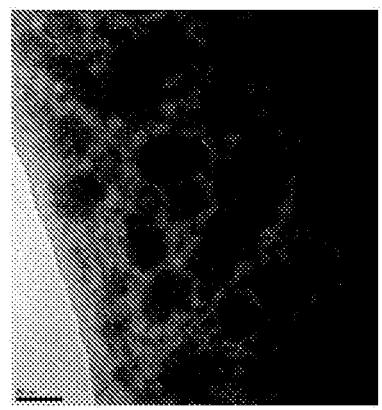
FIG. 13 illustrates a TEM image of transparent glass composites in accordance with exemplary embodiments of the present invention.

TEM studies were performed on $GdF_3$ and $GdBr_3$ based glass composite samples to confirm the presence and character of nanoparticles. These studies did indeed indicate the presence of nanoparticles of <30 nm in size. FIGS. 12 (a) and 12 (b) shows a $GdF_3$-based aluminosilicate glass composite prepared with nanocrystals embedded in the glass body. The TEM image shows well-defined crystalline fringe planes as shown in FIG. 12(b). From the $GdBr_3$ based glass samples, nanoparticles were also observed as shown in the TEM images in FIG. 13.

DTA data suggested that the as-cast glass should be aged between 600-750° C. to produce a glass-composite. Samples were also aged at 950° C. due to the presence of a large exothermic peak in this temperature region as well. Transparency was maintained at all aging times and temperatures except for 48 hours at 950° C., when the sample became completely white and opaque. This seems to indicate that matrix devitrification occurs at the 950° C. exotherm. DTA scans of finely and coarsely ground glass were analyzed to determine the extent to which surface crystallization dominates the precipitation mechanism. Both scans used the same heating rate, atmosphere, and sample mass to avoid any externally induced discrepancies.

PL measurements were used to observe changes in luminescent intensity among aged samples. FIG. 14 shows a plot of PL data for samples of base glass aged for 5, 24, and 48 hours at 750° C. and excited at 350 nm. PL measurements were also performed on a sample of unaged glass for comparison purposes.

The experimental alumina-silica glass composite with gadolinium bromide scintillator and cerium bromide activator functioned successfully as a detector for a gamma-ray spectrometer. Over 450 measurements were carried out including the use of various radionuclide sources, counting parameters and scintillator size and composition. Several versions of the material were tested with sizes ranging from small, 2-3 $cm^3$ in volume to the largest detector made at 15 cm$^3$ in volume. The tested samples are described in Table 4. Most of these samples contains 57 wt % (Gd+Ce)Br$_3$ which was optimized based on the composition study. Results obtained from sample #12, a cylinder 2.5 cm in diameter and 3.0 cm long, were used to demonstrate the principle of nuclear radiation spectroscopy from a glass nanocomposite and are highlighted below. Additionally, for comparison, samples prepared loaded with cerium bromide only and with gadolinium bromide only were tested.

TABLE 4

| Scintillator | # | weight |
|---|---|---|
| Alumina-silica | | |
| 57%GdBr3(Tb) | | |
| 57%GdBr3(Ce) | | |
| 57%GdBr3(Ce) | 1 & 2 | 10 g/, 11.3 g |
| 57%GdBr3(Ce) | 1 | 10 g |
| 57%GdBr3(Ce) | 3 | |
| 57%GdBr3 (Ce) | 5 | 14 g |
| 57%GdBr3(Ce) | 6 | 26 g |
| 57%GdBr3(Ce) | 7 | 7.3 g |
| 5&%GdBr3(Ce) | 8 | |
| 57%GdBr3(0% Ce) | 9 | |
| 57%GdBr3(Ce) | 10 | 20 g |
| 57%GdBr3(Ce) | 12 | 48 g., 15 cc |
| 57%GdBr3(Ce) | 11 | |
| 57%GdBr3(Ce) | 14 | 43 g |
| 57%GdBr3(Ce) | 15 | |
| 57%GdBr3(Ce) | 3(Li$^+$, not Na$^+$) | 17 g |
| Sodium borosilicate | | |
| 57% GdBr3(Ce) | 3 | |
| 57% GdBr3(Ce) | 10 | 20 g |
| 50%GdBr3(Ce) | 14 | 10.6 g |
| 40%GdBr3(Ce) | 15 | 45 g., 15 cc |
| 40%GdBr3(Ce) | 16 | 42 g |

Figure 16:
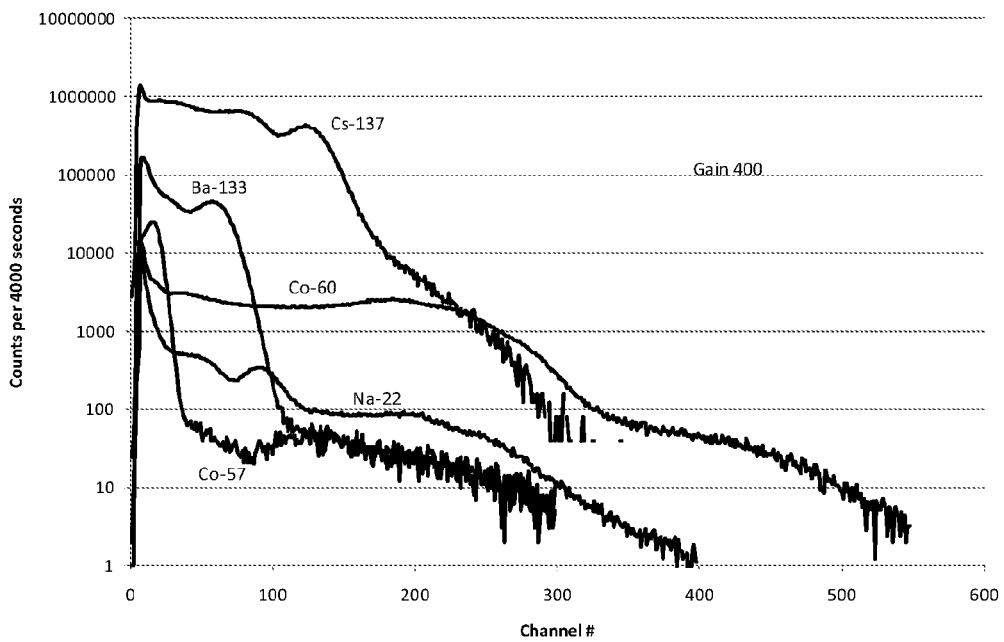
FIG. 16 illustrates spectra from a detector fabricated in accordance with exemplary embodiments of the present invention.
Figure 17:
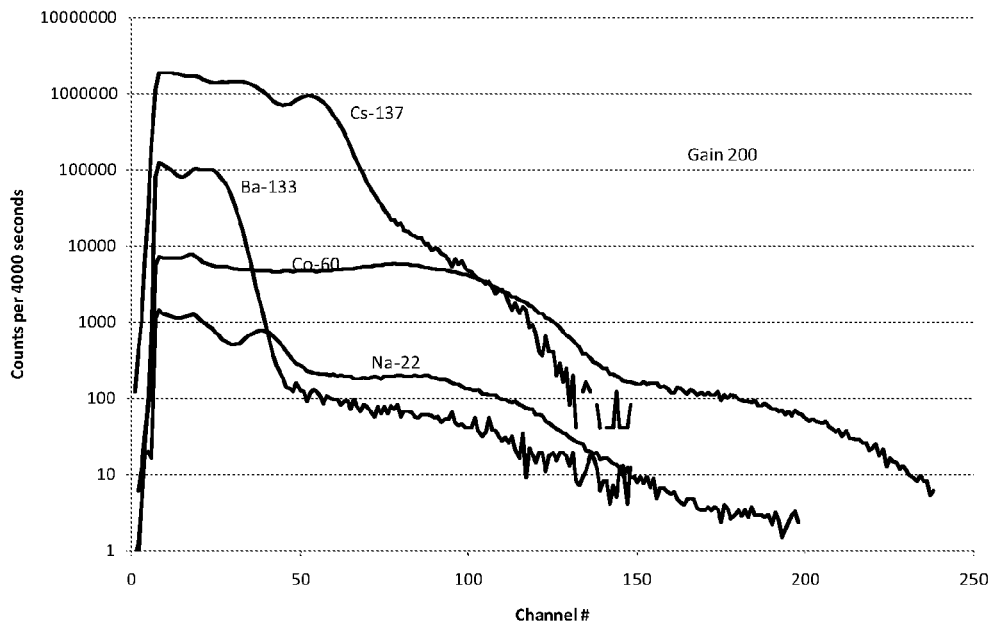
FIG. 17 illustrates spectra from a detector fabricated in accordance with exemplary embodiments of the present invention.

The gamma-ray spectra of 4-6 radionuclides that emit gamma rays obtained from a glass composite detector fabricated, shown in FIG. 15, FIG. 16, and FIG. 17, present the expected Compton continua and full-energy (photoelectric) peaks. The full-energy peaks are comparable to the Compton continua in intensity but at poorer resolution than the spectra obtained with a 5 cm dia.×5 cm long, 100 cm$^3$, NaI(Tl) detector. The three system gains at which the spectra were recorded are noted in the Figures. For each measurement, the cylinder was attached to the PMT with optical grease, and a gamma-ray source was placed at the other end of the cylinder. A steel planchet of 2,000 mg cm$^{-2}$ thickness was placed between source and detector to absorb all alpha and beta particles. The glass detector was covered with Teflon reflecting tape on its sides and the far end. The sources and their gamma-ray energies were $^{241}$Am (59.5 keV), $^{57}$Co (122 keV), $^{133}$Ba (81 and 356 keV), $^{22}$Na (511 and 1,275 keV), $^{137}$Cs (662 keV), and $^{60}$Co (1,173 and 1,332 keV).

The ratio of energy in keV to channel number is linear at all three gains; it was 3.1, 6.2, and 14, respectively at gains 800, 400, and 200. Relative to the NaI(Tl) detector, the glass detector requires a gain that is, on the average, 23 times as great to locate full-energy peaks at the same channel number, i.e., the amplification needed for the glass detector is 23 times that for the NaI(Tl) detector. The resolution, in terms of full width at half maximum for the $^{137}$Cs peak at 662 keV is 26%, compared to 7% for NaI(Tl). The counting efficiency for the glass detector is 2.6% compared to 12.2% for NaI(Tl), but the latter detector has 7 times the volume of the former. Compared to a 12 cm$^3$ (2.5 cm dia.×2.5 cm) NaI(Tl) detector, the counting efficiency was approximately the same.

Figure 18:
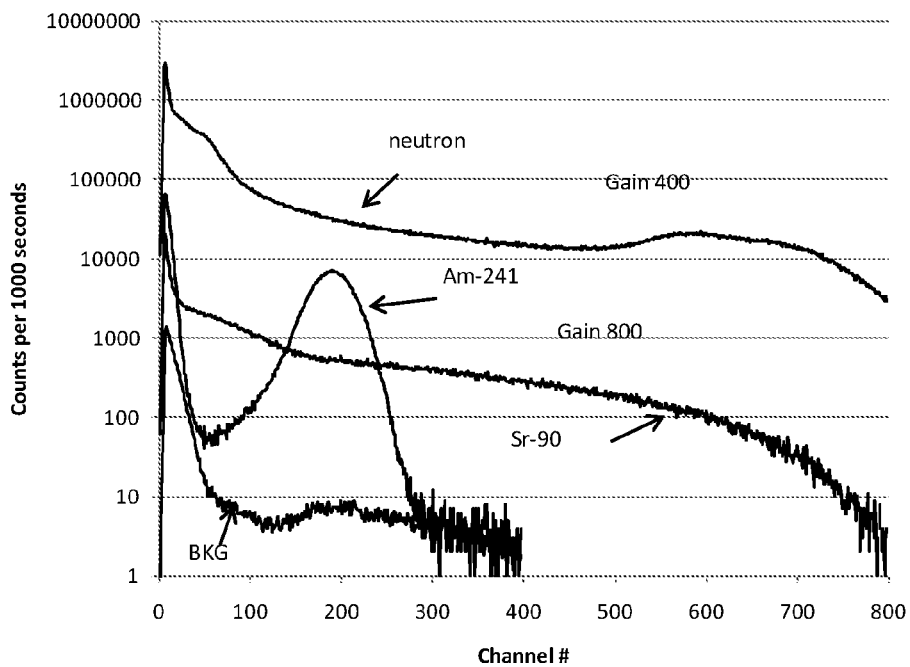
FIG. 18 illustrates spectra from a detector fabricated in accordance with exemplary embodiments of the present invention.

The experimental detector also functions successfully to provide energy spectra for alpha particles, beta particles, and neutrons, as shown in FIG. 18. The steel planchet and Teflon tape over the end of the cylinder were removed for these measurements. The 5.5 MeV alpha-particle peak of $^{241}$Am is in a channel approximately 11 times lower than for gamma rays of corresponding energy, with a resolution of 26%. The beta-particle source of $^{90}$Sr (546 keV max.) and $^{90}$Y (2,283 keV max.) in equilibrium shows the expected energy continuum, with end points for the two radionuclides that correspond to gamma-rays of the same energies. The fast-neutron spectrum of the Pu/Be source shows an energy continuum with peaks at the low and high end.

For the sample prepared without the cerium bromide activator, no light emission was observed and the sample did not function as a gamma-ray detector. The other sample, which was prepared without the gadolinium bromide host material, exhibited a black opaque appearance. and did not emit light or function as a gamma-ray detector. Several other lanthanide halides in glass also were tested, but showed no gamma ray spectral output.

Example 3

Europium Doped Calcium Fluoride

Figure 19:
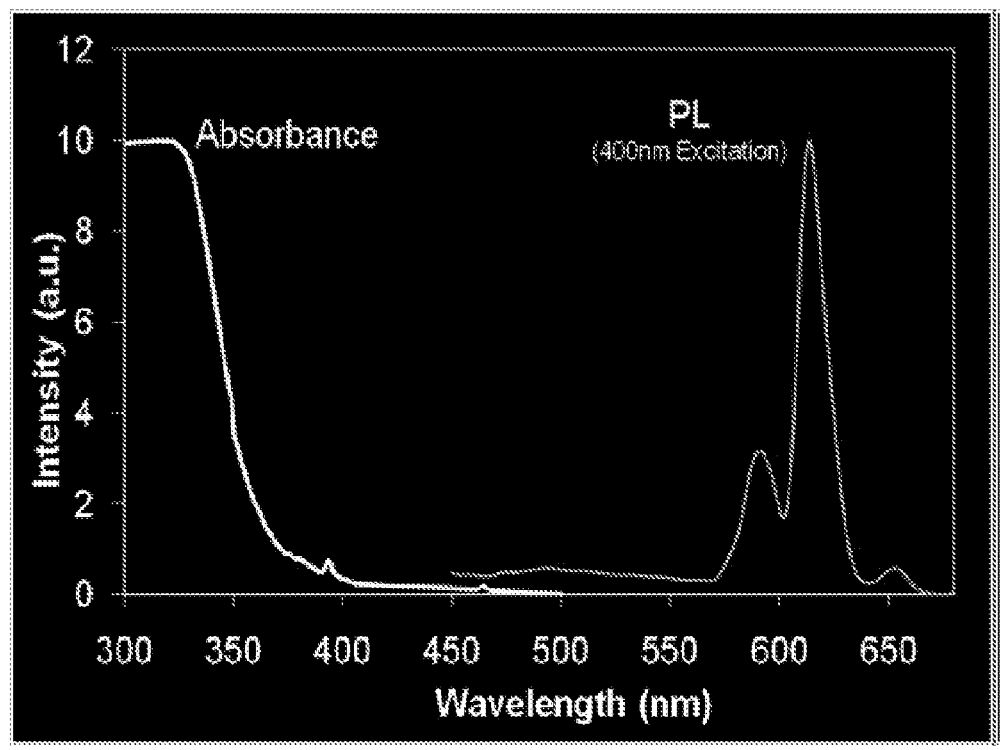
FIG. 19 illustrates photoluminescence spectra in accordance with exemplary embodiments of the present invention.

A glass with the molar composition 45SiO$_2$-20Al$_2$O$_3$-10CaO-25CaF$_2$-0.1Eu$_2$O$_3$ (or EuF$_2$) was prepared. Reagent grade SiO$_2$, Al$_2$O$_3$, CaO, CaF$_2$, and Eu$_2$O$_3$ (or EuF$_2$) were used as starting materials. The batch was placed in a platinum crucible and melted at 1400° C. for 2 h. To obtain the europium ions in the divalent state, carbon black powders were placed beside the crucible during the glass melting process. However, weak blue and strong red luminescence was observed from the prepared glass and glass composite samples, indicating most of the Eu ions were oxidized into Eu$^{3+}$ states. The melt was cast onto a preheated, stainless steel plate, and subsequently annealed and cooled to room temperature. Glass composite was fabricated by heat treating the glass at 760 C for 3 h. The glass composite maintained a high transparency in the visible region. Luminescence spectra under UV excitation for the glass composite are shown in FIG. 19. The observed red emission peaks are attributed to the 4f transitions in Eu$^{3+}$ ions.

Example 4

Terbium Doped Gadolinium Glass Composites

Tb doped GdF$_3$, GdCl$_3$ and GdBr$_3$ based glass and glass composite systems were also prepared. For example, Tb$^{3+}$ doped oxyfluoride alumino-silicate glasses were also prepared with a composition of 44SiO$_2$-28Al$_2$O$_3$-17NaF-11GdF$_3$-1.0TbF$_3$ (mol %). Reagents of SiO$_2$, Al$_2$O$_3$, NaF, GdF$_3$, TbF$_3$ were used as raw materials. Each batch weighing about 20 g was mixed homogeneously and melted at 1400° C. for 2 hours in a platinum crucible in air. The melts were poured onto a cold steel plate to form a glass with a thickness of about 6 mm and a good transparency. All the glasses were annealed at 400° C. for 2 h to remove thermal strains. Green emitting transparent glass composites were obtained after a heat-treatment at 650° C. for 3.

Figure 20:
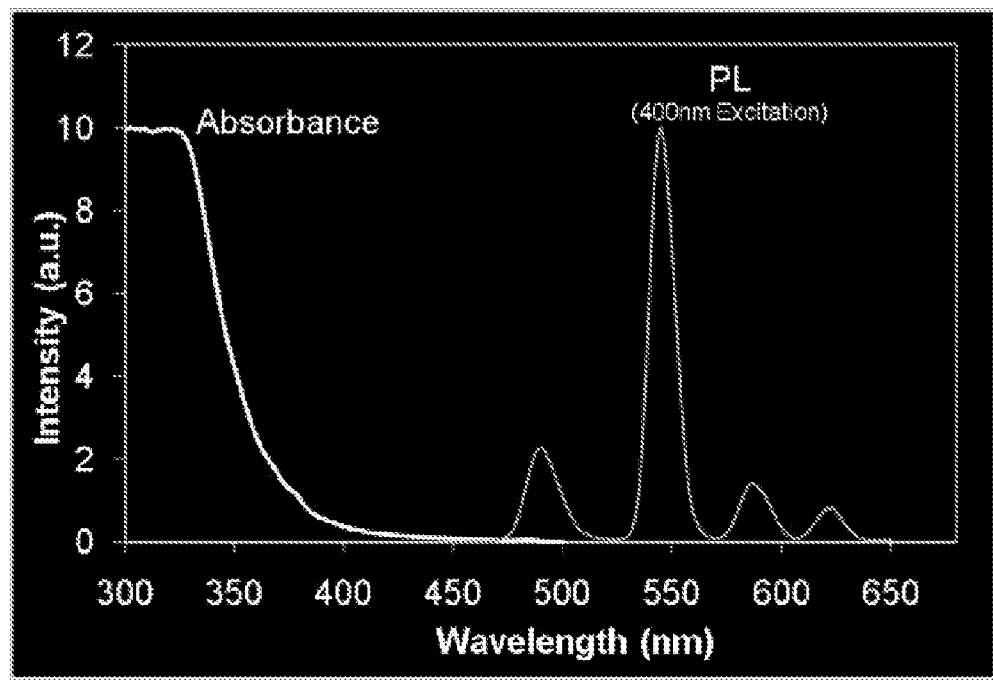
FIG. 20 illustrates photoluminescence spectra in accordance with exemplary embodiments of the present invention.

The absorption spectra were measured by using a Carry UV-Vis double beam spectrophotometer. The photoluminescence spectra were measured by using an Oceanoptics spectrophotometer with a 254 nm UV lamp for excitation. FIG. 20 shows the emission spectra of Tb$^{3+}$-doped glass composite.

From these spectra, four emission bands centered at 491 nm ($^5D_4 \rightarrow {}^7F_6$), 545 nm ($^5D_4 \rightarrow {}^7F_5$), 587 nm ($^5D_4 \rightarrow {}^7F_4$) and 622 nm ($^5D_4 \rightarrow {}^7F_3$) have been observed. Of them, 545 nm ($^5D_4 \rightarrow {}^7F_5$) has shown bright green emission. The emission transitions have shown sharp emission bands due to the f-f inner shell transitions, from the excited level to the lower level such as $^5D_4 \rightarrow {}^7F_{J(=0-6)}$ for $Tb^{3+}$. When $Tb^{3+}$ ions are excited by UV radiation, electronic transition of either $^5D_3 \rightarrow {}^7F_J$ (blue emission) or successive $^5D_3 \rightarrow {}^5D_4$ and $^5D_4 \rightarrow {}^7F_J$ (green emission) takes place, where J=0, 1, . . . , 6. Emission bands with smaller widths and larger intensities are noticed from 480 nm to 630 nm. The intense green emission is at 545 nm, arises from the Laporte-forbidden $^5D_4 \rightarrow {}^7F_5$ transition. The transition $^5D_4 \rightarrow {}^7F_6$ obeys the magnetic-dipole selection rule of $\Delta J=\pm 1$.

Example 5

$LaF_3$—$CeF_3$

Lanthanum fluoride and cerium fluoride were mixed with silica, alumina and boron oxide to form a precursor glass. The molar ratio of the compound is $43B_2O_3$-$15SiO_2$-$12Al_2O_3$-$27LaF_3$-$3CeF_3$. The mixed powders were loaded into an alumina crucible with a graphite plate cover and melted at 1200° C. for 3 hours in an argon atmosphere to form a homogeneous liquid mixture. The melt was then quenched by directly casting into a 400° C. preheated graphite mold of desired shape. The cast glass samples were subsequently annealed at 680° C. for 2-24 hours to precipitate $LaF_3$ nanoparticles.

Example 6

Eu Doped $SrI_2$

Strontium iodide containing glass composite scintillator is prepared by mixing 8-28 mol % strontium iodide, 0.1-5 mol % europium fluoride with 14-34 mol % boron oxide, 5-16 mol % silica, 17-37 mol % zinc oxide and 9-29 mol % sodium oxide to form a precursor glass.

The mixed powders are loaded into an alumina crucible with a graphite plate cover and melted at 800° C. for 1 hour in an argon atmosphere to form a homogeneous liquid mixture. The melt was then quenched by directly casting into a 400° C. preheated graphite mold of desired shape, and then is annealed at 680° C. for 2-24 hours.

Example 7

Phosphate Glass Composite

Silicate and aluminosilicate glasses have higher melting temperatures, typically >1200° C., which are better for the incorporation of fluorides, chlorides and bromides with relatively high melting points. For some low melting chlorides and bromides, glass matrices such as phosphates are a good choice because of lower processing temperatures (<1000° C.). Therefore, phosphate glass based materials were prepared. $Ca(H_2PO_4)_2 \cdot xH_2O$ and $Na_2HPO_4 \cdot 7H_2O$ were used to fabricate the phosphate glass with Gd and La halides incorporated into the glass body.

Example 8

Sodium-Borosilicate Glass

The purpose of investigating the sodium-borosilicate (NBS) and alumino-borosiliate (ABS) glass systems was to find a matrix glass with a melting temperature below 1400° C. and a large network free volume to allow a high concentration of $GdBr_3(Ce)$ to be incorporated while maintaining sample transparency. The initial standard was set by the aluminosilicate system in which 18 mol % $GdBr_3(Ce)$ was achievable with a processing temperature of 1450° C. Studies designed to lower processing temperature while increasing scintillator content are described below.

The basis for studying the sodium-borosilicate glass system included the lower melting temperature of this system (1350° C.) compared to the aluminosilicate system (1450° C.). Glass batching began with a control composition incorporating 1 wt % $Eu_2O_3$ into a base glass of 50 $B_2O_3$-25 $SiO_2$-25 $Na_2O$ (by weight). A sample of undoped base glass (NBS1) was first synthesized to ensure that the batch composition was able to be processed with available equipment. The base glass sample was easily cast at 1350° C., did not shatter during the annealing step, and was transparent upon cooling.

After determining that this glass system was a viable, $GdBr_3$ and $CeBr_3$ were incorporated into the precursor powder mixture in a concentration of 57 wt %, which is equivalent to the concentration achieved in the aluminosilicate system. This sample was labeled NBS3. While this melt was easily cast at 1350° C., the cooled sample was opaque with evidence of phase separation and solute rejection. The sample had a luminescent, translucent interior surrounded by a chalky white, opaque surface layer that showed no luminescence. Samples NBS5 and NBS6 sought to increase the number of tetrahedrally coordinated boron atoms in the glass body by increasing the sodium content according to the theories presented by Varshneya. Unfortunately, due to the formation of a more fluid phase in the melt, it appeared that the increased sodium induced phase separation in the base glass rather than create tetrahedrally coordinated boron atoms. Varshneya suggests that this problem may be mitigated by incorporating more compounds into the base glass, which causes a homogeneous melt to become more thermodynamically favorable due to increased entropy of mixing.

As with NBS1, a sample of undoped base glass was synthesized before $GdBr_3(Ce)$ doping was pursued. Glass batching literature suggests that calcium additions increase fluidity of the melt and promote rapid solidification, but can increase the risk of devitrification during quenching. Barium additions induce behavior similar to those of lime, but also increase the refractive index of the cooled glass. Hence, CaO and BaCO3 were incorporated into the $50B_2O_3$-$25SiO_2$-$25Na_2O$ glass, with the sample labeled NBS7. The melt was easily cast at 1200° C. with no phase separation visible and cooled to a transparent solid. After this success, $GdBr_3$ and $CeBr_3$ were incorporated at a conservative concentration of 30 wt %. This sample (NBS8) was easily cast at 1200° C., but acquired a yellow tint upon cooling with some regions exhibiting a stronger blue fluorescence than others under 365 nm exposure.

Figure 21:
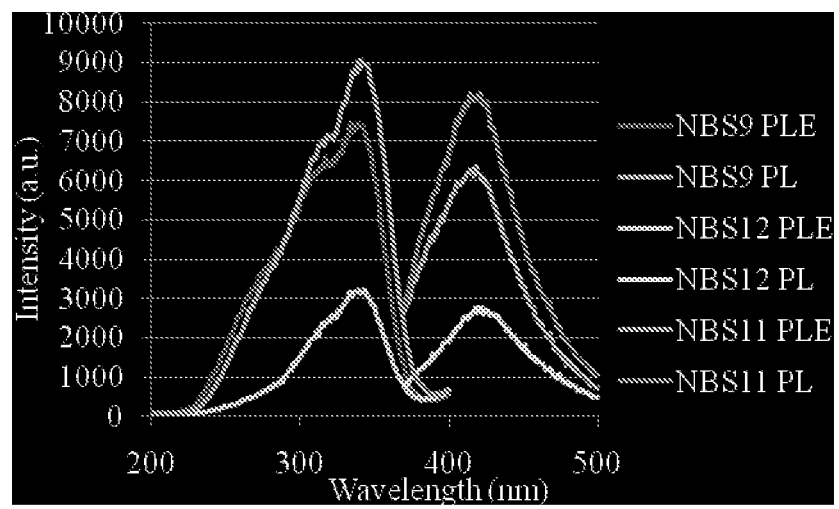
FIG. 21 illustrates photoluminescence emission and excitation spectra in accordance with exemplary embodiments of the present invention

The silica content was increased stepwise for samples NBS9 (35 wt %), 11 (45 wt %), and 12 (40 wt %) in an effort to stabilize the melt and increase the free volume available in the glass network, thus allowing a higher concentration of scintillating compounds to be incorporated. All samples were cast easily at 1250° C., though viscosity increased noticeably with silica content. All samples also had a slight yellow tint upon cooling and showed non-uniform blue fluorescence under 365 nm exposure. The greatest melt homogeneity was observed when the silica and borate content in the base glass were equal (35 wt % of the base glass), though the greatest luminescent intensity was observed with highest silica content (NBS11) as shown in FIG. 21

Figure 22:
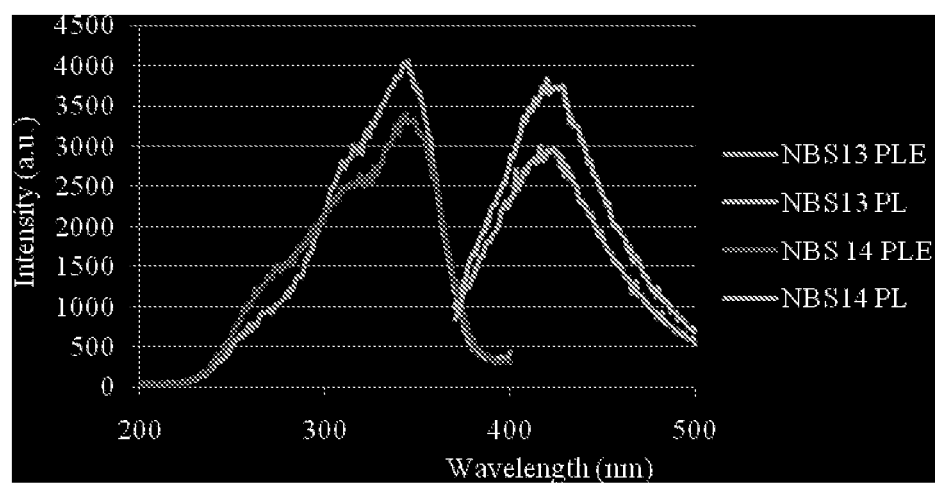
FIG. 22 illustrates photoluminescence emission and excitation spectra in accordance with exemplary embodiments of the present invention

Melt stability was determined to be of greater significance for scintillator performance, so subsequent samples focused on increasing the GdBr$_3$(Ce) concentration in a base glass of the composition 35 B$_2$O$_3$-35 SiO$_2$-13 BaO-11 Na$_2$O-7 CaO by weight. Samples in which GdBr$_3$(Ce) content was increased to 40 wt % (NBS13) and 50 wt % (NBS14) were synthesized, with extensive phase separation seen in NBS13 and somewhat reduced separation seen in NBS14. Upon cooling, both samples had a crusty, non-luminescent surface layer surrounding the more translucent, luminescent interior. FIG. 22 shows a plot of luminescence data for samples NBS13 and 14. The intensities of the two samples are very similar, suggesting that there is little effect from changing silica content as long as overall sample transparency is maintained. However, the additional silica in NBS14 does appear to increase the temperature at which GdBr$_3$(Ce) precipitates and the glass composite devitrifies relative to those observed in NBS13 (see Table 6).

Figure 23:
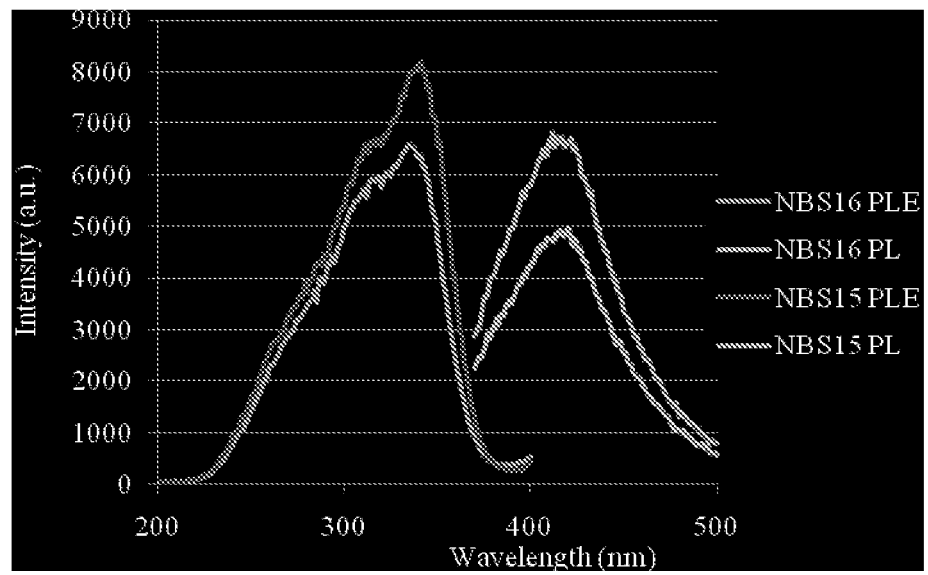
FIG. 23 illustrates photoluminescence emission and excitation spectra in accordance with exemplary embodiments of the present invention

Silica content was again increased in an attempt to further stabilize the melt while maintaining GdBr$_3$(Ce) concentration at 40 wt %. Sample NBS15 had a composition of 25 B$_2$O$_3$-45 SiO$_2$-13 BaO-11 Na$_2$O-7 CaO, which resulted in a homogeneous melt and transparent sample upon cooling, but the melt viscosity was not low enough to allow casting until the temperature was increased to 1400° C. Similarly, sample NBS16 had a composition of 20 B$_2$O$_3$-50 SiO$_2$-13 BaO-11 Na$_2$O-7 CaO, with the melt not reaching sufficient fluidity for casting until 1450° C. The cooled glass appeared transparent, though a few bubbles were visible, and exhibited blue fluorescence under 365 nm exposure. Luminescence data for the two samples is given in FIG. 23. The melt of NBS15 was more fluid due to lower silica content, which may have yielded a more homogeneous sample upon cooling, thus resulting in the increased light yield seen in the PL/PLE peaks. Seeking to combine the benefits of increased silica content, melt homogeneity, and higher concentration of GdBr3(Ce), 50 wt % GdBr3(Ce) was incorporated into a base glass composition of 25 B$_2$O$_3$-45 SiO$_2$-13 BaO-11 Na$_2$O-7 CaO (NBS17). The melt was heated to 1450° C. to facilitate casting, but had a cloudy appearance and cracked during cooling.

A summary of sodium-borosilicate based compositions are shown in Table 5. Data for variations in glass transition temperatures (Tg), scintillating crystal precipitation temperatures (Tc), and matrix glass devitrification temperatures for the most relevant samples in the NBS series are shown in Table 6.

TABLE 6

| NBS Sample | Tg (° C.) | Tc (° C.) | Devitrification (° C.) |
|---|---|---|---|
| 1 | 415 | 540 | 800 |
| 2 | 425 | 615 | 775 |
| 3 | 430 | 585 | 725 |
| 6 | ? | 545 | 845 |
| 8 | 420 | 515 | 800 |
| 9 | 450 | 525 | 800 |
| 11 | 460 | 550 | 785 |
| 13 | 425 | 615 | 825 |
| 14 | ? | 645 | 835 |
| 15 | 435 | 600 | 810 |

Example 9

Alumino-Borosilicate Glass System (ABS)

The initial sample (ABS1) contained 30 mol % GdBr$_3$(Ce). At 1350° C., the melt had sufficient fluidity for casting and cooled to a homogeneous and transparent sample. Sample ABS2 contained 10 mol % GdBr$_3$(Ce) and was too viscous to cast at 1350° C. The DTA traces suggested that the lower GdBr$_3$(Ce) concentration in ABS2 results a lower volume fraction of precipitated crystallites, as indicated by the nearly invisible crystallization peak in the ABS2 trace compared to that in ABS1. GdBr$_3$(Ce) content in sample ABS3 was increased to 20 mol %, and resulted in a fluid, easily cast melt once again and a transparent sample upon cooling.

Figure 24:
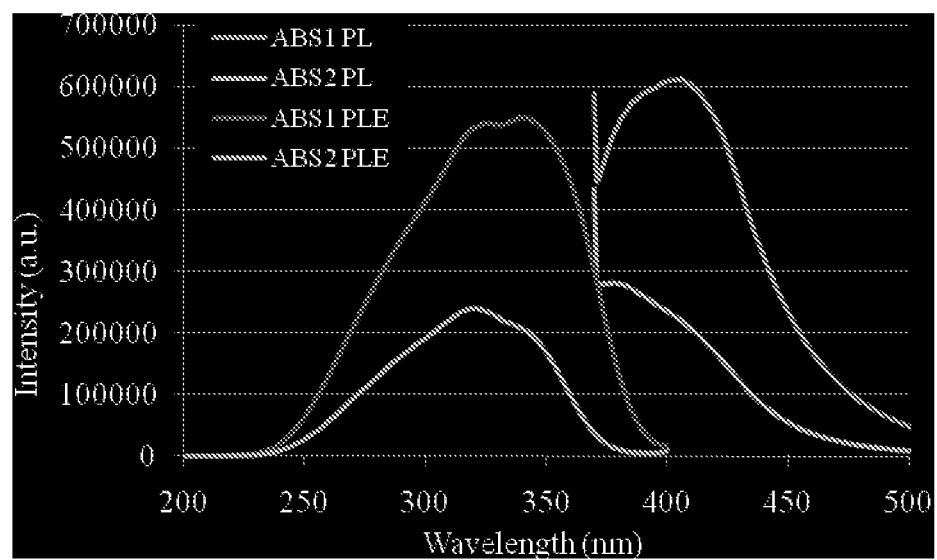
FIG. 24 illustrates photoluminescence emission and excitation spectra in accordance with exemplary embodiments of the present invention

Luminescence data for samples ABS1 and 2 correlate well with expected behavior. FIG. 24 shows that peaks in the ABS1 scan are of much greater intensity than in the ABS2 scan as GdBr$_3$(Ce) concentration is 20 mol % greater in ABS1 than ABS2.

A summary of alumino-borosilicate based compositions is listed in Table 7

TABLE 5

| | Composition (Weight %) | | | | | | | |
|---|---|---|---|---|---|---|---|---|
| NBS Sample | SiO2 | B2O3 | Na2O | CaO | BaO | GdBr3 | CeBr3 | Weight % GdBr3(Ce) |
| 1 | 25 | 50 | 25 | 0 | 0 | 0 | 0 | 0% |
| 2 | 9 | 24 | 9 | 0 | 0 | 48 | 8 | 57% |
| 3 | 9 | 22 | 9 | 0 | 0 | 49 | 8 | 59% |
| 4 | 10 | 21 | 10 | 0 | 0 | 49 | 9 | 59% |
| 5 | 20 | 8 | 13 | 0 | 0 | 49 | 9 | 59% |
| 6 | 19 | 7 | 17 | 0 | 0 | 47 | 8 | 56% |
| 7 | 10 | 18 | 4 | 3 | 5 | 0 | 0 | 0% |
| 8 | 15 | 27 | 7 | 4 | 8 | 32 | 6 | 38% |
| 9 | 24 | 24 | 8 | 5 | 9 | 26 | 5 | 31% |
| 10 | 24 | 24 | 8 | 5 | 9 | 26 | 5 | 31% |
| 11 | 31 | 17 | 8 | 5 | 9 | 25 | 5 | 30% |
| 12 | 28 | 14 | 8 | 6 | 14 | 25 | 5 | 30% |
| 13 | 21 | 21 | 7 | 4 | 8 | 33 | 6 | 39% |
| 14 | 17 | 17 | 5 | 3 | 6 | 42 | 8 | 51% |
| 15 | 27 | 15 | 7 | 4 | 8 | 33 | 6 | 39% |
| 16 | 30 | 12 | 7 | 4 | 8 | 33 | 8 | 40% |
| 17 | 22 | 12 | 5 | 3 | 6 | 43 | 8 | 52% |

TABLE 7

| | Composition (Weight %) | | | | | | |
|---|---|---|---|---|---|---|---|
| ABS Sample | SiO2 | B2O3 | Na2O | Al2O3 | GdBr3 | CeBr3 | Weight % GdBr3(Ce) |
| 1 | 7 | 9 | 4 | 11 | 58 | 11 | 69% |
| 2 | 19 | 16 | 9 | 23 | 28 | 6 | 34% |
| 3 | 11 | 13 | 6 | 16 | 48 | 7 | 54% |

The following publications in their entireties are hereby incorporated by reference into this application as if fully set forth herein in order to more fully describe the state of the art to which the disclosed matter pertains.

Sheng Dai, Suree Saengkerdsub, Hee-Jung Im, A. C. Stephan, S. M. Mahurin, in Unattended Sensor Systems for Remote Applications, J. I. Trompka et al., eds., Am Inst. Phys. (2002) 220.

S. E. Letant, T.-F. Wang, App. Phys. Lett. 88 (2006) 103110.

S. E. Letant, T.-F. Wang, Nano Lett. 6 (2006) 2877.

E. A. McKigney, E. Del Sesto, L. G. Jacobsohn, P. A. Santi, R. E. Muenchausen, K. C. Ott, T. M. McCleskey, B. L. Bennett, J. F. Smith, D. W. Cooke, Nucl. Instr. and Meth. A 574 (2007) 110.

Optical and scintillation properties of pure and Ce3+ doped $GdBr_3$. van Loef, E. 2001, Optics Communications, Vol. 189, pp. 297-304

H. Ishibashi, K. Kurashige, Y. Kurata, K. Susa, M. Kobayashi, M. Tanaka, K. Hara, M. Ishii, IEEE Trans. Nucl. Science 45 (1998) 518.

M. Tanaka, K. Hara, S. Kim, H. Takano, M. Kobayashi, H. Ishibashi, K. Kurashige, K. Susa, M. Ishii, Nucl. Instr. and Meth. A 404 (1998) 283.

E. V. D. van Loef, F. Dorenbos, C. W. E. van Eijk, K. W. Kramer, H. U. Güdel, Optics Communications 189 (2001) 297.

G. F. Knoll, Radiation Detection and Measurement, $3^{rd}$ ed. (John Wiley & Sons, New York) (2000) 244.

Gadolinium solubility in peralkaline borosilicate glasses. Li, L. 1-3, 2001, Journal of Non-Crystalline Solids, Vol. 283, pp. 237-245.

Partitioning of gadolinium and its induced phase separation in sodium-aluminoborosilicate glasses. Qian, M. 1, Jan. 2004, Journal of Non-Crystalline Solids, Vol. 333, pp. 1-15.

Liquid immiscibility in complex borosilicate glasses. Taylor, P and Owen, D G. 6984, 1980, Journal of Non-Crystalline Solids, Vol. 42, pp. 143-150.

Self-organized nano-crystallization of BaF2 from Na2O/K2O/BaF2/Al2O3/SiO2 glasses. Bocker, C., et al., et al. 2009, Journal of the European Ceramic Society, Vol. 29, pp. 1221-1225.

Nucleation efficiency of erbium and ytterbium fluorides in transparent oxyfluoride glass-ceramics. Dantelle, G., Mortier, M. and Vivien, D. 2, 2005, Journal of Materials Research, Vol. 20, pp. 472-481.

Halem, H. Glass Notes. 3rd. Kent, Ohio: Franklin Mills Press, 1996.

Experimental evidence of self-limited growth of nanocrystals in glass. Bhattacharyya, S. 6, Jun. 2009, Nano Letters, Vol. 9, pp. 2493-2496.

Structural characterisation of transparent oxyfluoride glass-ceramics. Mortier, M. and Patriarche, G. 2000, Journal of Materials Science, Vol. 5, pp. 4949-4856.

Size distribution of BaF2 nanocrystallites in transparent glass ceramics. Bocker, C., et al., et al. 20, Dec. 2009, Acta Materialia, Vol. 57, pp. 5956-5963.

Glass-Ceramics: Engineering Principles and Applications. Sakamoto, A. and Yamamoto, S. 3, Sep. 2010, International Journal of Applied Glass Science, Vol. 1, pp. 237-247.

Nucleation efficiency of erbium and ytterbium fluorides in transparent oxyfluoride glass-ceramics. Dantelle, G., Mortier, M. and Vivien, D. 2, 2005, Journal of Materials Research, Vol. 20, pp. 472-481.

Optical investigation of Eu3+ in a sodium borosilicate glass: Evidence for two different site distributions. Pucker, G., et al., et al. 10, Mar. 1996, Physical Review B, Condensed Matter, Vol. 53, pp. 6225-6234.

The embodiments of the present invention are not limited to the particular formulations, process steps, and materials disclosed herein as such formulations, process steps, and materials may vary somewhat. Moreover, the terminology employed herein is used for the purpose of describing exemplary embodiments only and the terminology is not intended to be limiting since the scope of the various embodiments of the present invention will be limited only by the appended claims and equivalents thereof.

Therefore, while embodiments of this disclosure have been described in detail with particular reference to exemplary embodiments, those skilled in the art will understand that variations and modifications can be effected within the scope of the disclosure as defined in the appended claims. Accordingly, the scope of the various embodiments of the present invention should not be limited to the above-discussed embodiments, and should only be defined by the following claims and all equivalents.

What is claimed is:

1. A transparent glass composite comprising a glass body and a plurality of nanoparticles distributed within the glass body; wherein an initial composition used to prepare the glass composite comprises a matrix metal compound and a dopant metal compound, the combination of the matrix metal compound and the dopant metal compound is at least 10 mol % of the initial composition, and the dopant metal compound is at least about 1.5 mol % of the initial composition.

2. The transparent glass composite of claim 1, wherein the combination of matrix metal compound and dopant metal compound is at least 15 mol % of the initial composition.

3. The transparent glass composite of claim 1, wherein the combination of matrix metal compound and dopant metal compound is at least 18 mol % of the initial composition.

4. The transparent glass composite of claim 1, wherein the combination of matrix metal compound and dopant metal compound is between about 10 mol % to about 35 mol %.

5. The transparent glass composite of claim 1, wherein the dopant metal compound is between about 2.5 mol % to about 7 mol % of the initial composition.

6. The transparent glass composite of claim 1, wherein the nanoparticles have an average size of between about 1 nm and about 50 nm.

7. The transparent glass composite of claim 1, wherein the nanoparticles have an average size of between about 2 nm and about 40 nm.

8. The transparent glass composite of claim 1, wherein the nanoparticle has a refractive index $n^M$ and the glass body has a refractive index $n^G$, and $n^M$ differs from $n^G$ by less than about 50%.

9. The transparent glass composite of claim 1, wherein the nanoparticle has a refractive index $n^M$ and the glass body has a refractive index $n^G$, and $n^M$ differs from $n^G$ by less than about 33%.

10. The transparent glass composite of claim 1, wherein the glass body comprises a silicate, a borate, or a phosphate, or combination thereof.

11. The transparent glass composite of claim 10, wherein the silicate comprises a lithium counterion or sodium counterion, or a combination thereof.

12. The transparent glass composite of claim 1, wherein the glass body comprises an aluminosilicate.

13. The transparent glass composite of claim 1, wherein glass body comprises a $^6$Li isotope or a $^{10}$B isotope.

14. The transparent glass composite of claim 1, wherein the matrix metal compound comprises Gd, Sr, Ba, Lu, La, Y, or Ca.

15. The transparent glass composite of claim 14, wherein the matrix metal compound comprises Gd.

16. The transparent glass composite of claim 1, wherein the dopant metal compound comprises Ce, Tb, Eu, Er, Tl, Tm, Pr, Dy, Ho, Sm, or Nd.

17. The transparent glass composite of claim 16, wherein the dopant metal compound comprises Ce, Tb, or Eu.

18. The transparent glass composite of claim 1, wherein the dopant metal compound and/or the matrix metal compound comprises fluoride, chloride, bromide, or iodide, or a combination thereof.

19. The transparent glass composite of claim 1, wherein the dopant metal compound is a cerium halide and the matrix metal compound a gadolinium halide.

20. A transparent glass composite comprising a glass body and a plurality of nanoparticles distributed in a glass body, wherein the glass body is prepared by heating an initial composition comprising a dopant metal halide, a matrix metal halide, and an inorganic glass former to the melting point of the initial composition to form a molten glass, cooling the molten glass to form a glass body, and optionally reheating the glass body to above its glass transition temperature for about 2 to about 72 hours, wherein the combination of the dopant metal halide and the matrix metal halide comprises at least 10 mol % of the initial composition, and the dopant metal compound is at least about 1.5 mol % of the initial composition.

21. The transparent glass body of claim 20, wherein the combination of the dopant metal halide and the matrix metal halide comprise at least 15 mol % of the initial composition.

22. The transparent glass body of claim 20, wherein the combination of the dopant metal halide and the matrix metal halide comprise at least 18 mol % of the initial composition.

23. The transparent glass body of claim 20, wherein the combination of the dopant metal halide and the matrix metal halide comprise between about 10 mol % to about 35 mol % of the initial composition.

24. The transparent glass composite of claim 20, wherein the dopant metal halide comprises between about 2.5 mol % to about 7 mol % of the initial composition.

25. The transparent glass composite of claim 20, wherein the nanoparticles have an average size of between about 1 nm and about 50 nm.

26. The transparent glass composite of claim 20, wherein the nanoparticles have an average size of between about 2 nm and about 40 nm.

27. The transparent glass composite of claim 20, wherein the matrix metal compound comprises a halide of Gd, Sr, Ba, Lu, La, Y, or Ca.

28. The transparent glass composite of claim 20, wherein the matrix metal compound comprises a gadolinium halide.

29. The transparent glass composite of claim 20, wherein the dopant metal compound comprises a halide of Ce, Tb, Eu, Er, Tl, Tm, Pr, Dy, Ho, Sm or Nd.

30. The transparent glass composite of claim 20, wherein the dopant metal compound comprises a halide of cerium, europium, or terbium.

31. A transparent glass scintillator comprising an initial composition of a dopant metal compound, a matrix metal compound, and a silicate,
wherein the dopant metal compound comprises cerium, europium, terbium, erbium, thallium, promethium, dysprosium, holmium, samarium, neodymium, or thullium;
the matrix metal compound comprises gadolinium, barium or calcium, and
the silicate comprises an aluminosilicate, and
wherein the transparent glass scintillator contains a plurality of nanoparticles,
and the dopant metal compound is at least about 1.5 mol % of the initial composition.

32. The transparent glass scintillator of claim 31, wherein the matrix metal compound is a gadolinium halide.

33. The transparent glass scintillator of claim 31, wherein the dopant metal compound comprises cerium, europium or terbium.

34. The transparent glass scintillator of claim 31, wherein the nanoparticles have an average size of between about 1 nm and about 50 nm.

35. The transparent glass scintillator of claim 31, wherein the nanoparticles have an average size of between about 2 nm and about 30 nm.

36. A transparent glass scintillator of claim 31, wherein the combination of the matrix metal compound and dopant metal compound comprise at least 10 mol % of the mixture.

37. A transparent glass scintillator of claim 31, wherein the combination of the matrix metal compound and dopant metal compound comprise at least 15 mol % of the mixture.

38. A device comprising a transparent glass composite and a light amplifier or detector proximate to or in free optical path with the transparent glass composite;
wherein the transparent glass composite comprises a glass body and a plurality of nanoparticles distributed within the glass body, and an initial composition to prepare the glass composite comprises a matrix metal compound and a dopant metal compound, the combination of matrix metal compound and dopant metal compound is at least 10 mol % of the initial composition, and the dopant metal compound is at least about 1.5 mol % of the initial composition; and
wherein the device detects at least one type of radionuclear emission.

39. The device of claim 38, wherein the light amplifier comprises a photomultiplier tube or a photodiode element or array.

40. The device of claim 38, further comprising electronics in communication with the light amplifier and a multichannel analyzer.

41. The device of claim 38, wherein transparent glass composite and the light amplifier operate in the same region of the electromagnetic spectrum.

42. The device of claim 38, wherein the at least one type of nuclear radiation selected from the group consisting of gamma rays, x-rays, alpha particles, beta particles and neutrons.

43. The device of claim 42, wherein the device detects at least two types of nuclear radiation.

44. The device of claim 38, wherein the device detects gamma rays, x-rays, alpha particles, beta particles and neutrons.

* * * * *